United States Patent
Ito

(10) Patent No.: US 6,378,350 B1
(45) Date of Patent: Apr. 30, 2002

(54) SEAT BELT ANCHORAGE PLATE FOR SEAT BELT DEVICE AND METHOD FOR MANUFACTURING THE SAME

(76) Inventor: Tadao Ito, 65-6, Kounodai, Iwata-shi, Shizuoka-ken, 438 (JP)

( * ) Notice: Subject to any disclaimer, the term of this patent is extended or adjusted under 35 U.S.C. 154(b) by 0 days.

(21) Appl. No.: 09/576,583

(22) Filed: May 22, 2000

Related U.S. Application Data

(62) Division of application No. 09/174,402, filed on Oct. 14, 1998, now Pat. No. 6,120,061, which is a continuation of application No. 08/635,884, filed as application No. PCT/JP95/01709 on Aug. 29, 1995, now Pat. No. 5,899,499.

(30) Foreign Application Priority Data

| Aug. 31, 1994 | (JP) | ............................................ 06-206853 |
| Feb. 10, 1995 | (JP) | .............................................. 07-23076 |

(51) Int. Cl.⁷ ........................... B21D 28/26; B21D 19/12
(52) U.S. Cl. ........................... 72/333; 72/327; 72/379.2
(58) Field of Search ........................ 72/335, 333, 327, 72/359, 354.6, 379.2, 324; 29/890.052

(56) References Cited

U.S. PATENT DOCUMENTS

| 488,135 A | * | 12/1892 | Smith | 72/335 |
| 2,460,721 A | * | 2/1949 | Thompson | 72/333 |
| 3,575,122 A | * | 4/1971 | Brossart | 72/333 |
| 4,150,556 A | * | 4/1979 | Melnyk | 72/333 |
| 4,582,340 A | * | 4/1986 | Fohl | 280/808 |
| 5,050,906 A | * | 9/1991 | Kneip | 280/801 |
| 5,182,933 A | * | 2/1993 | Schick | 72/335 |
| 5,207,452 A | | 5/1993 | Collins | 280/801 |
| 5,237,849 A | * | 8/1993 | Miyazawa | 72/335 |

FOREIGN PATENT DOCUMENTS

| BE | 561328 | * | 5/1960 | 72/267 |
| DE | 91 02 217.7 | * | 7/1991 | |
| DE | 42 11 471 A1 | * | 10/1992 | |
| EP | 0223582 | | 5/1987 | |
| FR | 2311562 | * | 12/1976 | 280/801.1 |
| JP | 2-120272 | * | 9/1990 | 72/416 |
| SU | 683840 | * | 9/1979 | 72/324 |
| SU | 1034814 | * | 8/1983 | 72/327 |

* cited by examiner

Primary Examiner—Daniel C. Crane
(74) Attorney, Agent, or Firm—Thomas, Kayden, Horstemeyer & Risley

(57) ABSTRACT

A seat belt anchorage plate for a seat belt device formed with a plate shaped member (base) 2 is provided with a slot 6 into which a belt (waist belt) 13 is inserted and which has long edge parts opposed with each other. The belt 13 is folded back along the one long edge part 691 of the opposed long edge parts in the slot 6 so that the one long edge part 691 bears the tension of the belt 13. The one long edge part 691 is formed so as to expand in the direction opposite to that of the tension of the belt 13 toward a central part from both ends in its longitudinal direction.

3 Claims, 22 Drawing Sheets

SEAT BELT ANCHORAGE PLATE FOR SEAT BELT DEVICE AND METHOD FOR MANUFACTURING THE SAME

CROSS-REFERENCE TO RELATED APPLICATIONS

This application is a division of and claims priority to U.S. patent application Ser. No. 09/174,402 now U.S. Pat. No. 6,120,061, which is a continuation of and claims priority to U.S. patent application Ser. No. 08/635,884, filed Jul. 24, 1996 now U.S. Pat. No. 5,899,499, which is a 371 of PCT/JP95/01709, filed Aug. 29, 1995.

TECHNICAL FIELD

The present invention relates to a seat belt anchorage plate for a seat belt device for attaching the end of, for example, a seat belt for an automobile to a fixed part such as a vehicle body.

BACKGROUND ART

Conventionally, as such kind of seat belt anchorage plate, a plate illustrated in FIG. 38 has been well known. That is, a seat belt anchorage plate comprises a base (plate shaped member) 2 having a bolt hole 3 and a slot 69 formed thereon and is designed to be secured to a fixed part such as a vehicle body through the bolt hole 3 and to be connected to a belt 13 through the slot 69.

The belt 13 employs a thin band shaped woven fabric in which for example, polyester fibers are woven and is folded back in one long edge part 691-8 of the slot 69, so that tension is exerted on the one long edge part 691-8 which is linearly formed.

Since the above mentioned conventional seat belt anchorage plate has one long edge part 691-8 formed in a straight line, when the tension of the belt 13 is not exerted in the direction perpendicular to the one long edge part 691-8, the belt 13 is liable to laterally slide on the one long edge part 691-8 and come together to the end part of the long edge part 691-8. In other words, there has been encountered a problem that the belt is apt to be gathered to the end part of one long edge part 691-8. Even if the tension of the belt 13 is exerted in the direction perpendicular to the one long edge part 691-8, for example, according to an examination through a strength measuring test, the belt 13 itself will be thinly converged and tend to meet at one part on the one long edge part 691-8 when the tension is exerted on the belt 13. Further, since the one long edge part 691-8 is elastically bent and slightly recessed by virtue of the tension of the belt 13, the belt 13 is undesirably liable to be gathered to one part on the long edge part 691-8 in addition to the defect that the belt 13 itself thinly converges into one part.

Further, the belt 13 is advantageously curved so as to be folded along a center line in its longitudinal direction in order to maintain the flat state of the belt 13. Therefore, the belt 13 is normally inserted into the slot 69 under its curved state as stated above. However, when the belt 13 is curved in such a way, there arises a problem that both ends at the right and left sides of the belt 13 abut against, for example, both right and left ends of the one long edge part 691-8, and therefore, the belt 13 is inserted into the slot 69 with difficulty. As shown in FIG. 38, when both the end parts of the belt 13 swell out roundly, there also arises a problem that these swelling parts tend to more easily abut against both the end parts of one long edge part 691-8.

Still further, the slot 69 is formed by a press working. In this case, burs are liable to be formed at the corner parts in the side punched out by a press. When such burs are left as they are, they have possibility to cause an action similar to that of a cutter. Accordingly, the corner parts are ordinarily subjected to a rounding finish independent of a press working process, or a coating works to cover the entire corner parts with vinyl chloride or polyethylene or the like. As a result, there has been encountered a problem in terms of cost-up owing to such a finishing work or a coating work.

Additionally stated, as illustrated in FIG. 39, since a seat belt anchorage plate is formed with a plate shaped base 2, the area of one long edge part 691-8 for holding the belt 13 is small, so that surface pressure exerting on the belt 13 is disadvantageously increased.

The present invention was made by taking these problems into account and an object of the present invention is to provide a seat belt anchorage plate for a seat belt device and a method for manufacturing it capable of completely reducing surface pressure to be exerted on the belt even when tension acts on the belt.

DISCLOSURE OF INVENTION

In order to achieve the above described object, a feature of the invention is a seat belt anchorage plate for a seat belt device which is formed with a plate shaped member, the plate shaped member having a slot formed into which the belt is inserted; the slot having long edge parts opposed to each other one of which bears the tension of the belt folded back therein; and one of the long edge parts being formed to expand toward a central part from both end parts in its longitudinal direction.

The Invention also concerns a seat belt anchorage plate for a seat belt device formed with a plate shaped member having a slot into which the belt is inserted and which has long edge parts opposed to each other, the belt being folded back in one of the long edge parts so that the one long edge part bears the tension of the belt, wherein the one long edge part is formed so as to swell in the direction opposite to that of the tension of the belt toward a central part from both end parts in its longitudinal direction.

Another feature of the invention concerns the other long edge part opposed to the one long edge part being formed so as to extend along the one long edge part.

The invention also concerns the one long edge part being formed so that it is provided with a protrusion protruding from one surface of the plate shaped member and its cornerparts are rounded along the direction in which the belt is folded back.

The invention concerns the one long edge part being formed so as to have a protrusion which protrudes from the other side of the plate shaped member by bending a part of the plate shaped member from one surface side to the other surface side so that an area against which the belt abuts is increased and corner parts are rounded along the direction in which the belt is folded back due to the existence of the protrusion.

Another feature of the invention is the long edge part being formed so as to have one protrusion and the other protrusion respectively protruding from one surface and the other surface of the plate shaped member and their corner parts are rounded.

The invention also concerns the one long edge part being formed so as to have one protrusion and the other protrusion respectively protruding from one surface side and the other surface side of the plate shaped member by bending a part of the plate shaped member from one surface side to the other surface side of the plate shaped member and pressing the bent part to return to the one surface side, so that an area against which the belt abuts is increased owing to the one protrusion and the other protrusion, and further, their corner parts are rounded along the direction on which the belt is folded back.

The invention includes short edge parts except the one long edge part in the slot for connecting at least one long edge part to the other long edge part are formed so as to have a protrusion similar to that of the one long edge part.

The invention includes short curved edges for connecting the one long edge part to the other long edge part.

The invention includes a seat belt anchorage plate for a seat belt device formed with a plate shaped member, the plate shaped member having a slot formed thereon into which the belt is inserted; the slot having long edge parts opposed to each other, the belt being folded back in one of the long edge parts which bears the tension of the belt; and the one long edge part having a protrusion which protrudes from at least one surface of the one surface and the other surface of the plate shaped member.

The includes short edge parts except the one long edge part in the slot for connecting at least one long edge part to the other long edge part are formed so as to have a protrusion similar to that of the one long edge part.

Another feature of the invention includes the one long edge part having corner parts rounded along the direction in which the belt is folded back.

The invention includes respective protrusions having the amount of protrusion from the plate shaped member ranging from 15% to 60% as thick as the thickness of the plate shaped member.

The invention also concerns a method for manufacturing a seat belt anchorage plate for a seat belt device formed with a plate shaped member which has a slot formed into which the belt is inserted, the slot having an edge part provided with a protrusion which protrudes from the one surface of one surface and the other surface of the plate shaped member, the method comprising: a piercing step for punching out the preliminary hole of the slot from the plate shaped member; a burring step for forming a slot by pushing a punch larger than this preliminary hole thereinto and pushing out a part of the plate shaped member along this slot to form a protrusion; and a curved surface forming step for surface-pressing the protrusion formed in the burring step and rounding corner parts.

Additionally, the invention concerns a method for manufacturing a seat belt anchorage plate for a seat belt device formed with a plate shaped member which has a slot formed into which a belt is inserted, the slot having an edge part provided with a protrusion which protrudes from the one surface of the one surface and the other surface of the plate shaped member; the method comprising: a piercing step for punching out the preliminary hole of the slot from the plate shaped member; a surface-pressing step for removing sheared edge parts (burs) produced in the piercing step; a burring step for forming a slot by pushing a punch larger than this preliminary hole thereinto and forming a protrusion by pushing out a part of the plate shaped member along this slot; a curved surface forming step for surface-pressing the protrusion formed in the burring step and rounding corner parts; a restriking step for smoothly rounding edge parts opposite to the protrusion in the slot; and a separating step for cutting a seat belt anchorage plate with a prescribed form.

When tension is exerted upon the belt, the part of the belt which is reflected in one long edge part is tightly fixed to that one long edge part. Namely, the part of the belt which is folded back takes a configuration in which its central part in its lateral direction expands similarly to the one long edge part. As a result, the belt hardly slides laterally along the one long edge part. Therefore, even if the direction of the tension of the belt does not coincide with the direction perpendicular to the one long edge part, the belt will not slide sideward along the one long edge part so that it does not gather to the end part of the belt.

Further, since the central part of the belt in its lateral direction swells similarly to that of the one long edge part, the belt is always brought into a state in which it is expanded in its lateral direction. Accordingly, even when the belt itself tends to thinly converge upon exertion of tension on the belt, the width of the belt is maintained in an original state in the one of the long edges. That is, the belt does not gather at one part on the one long edge part. In addition, since the one long edge part expands in the direction opposite to the tension, even when the one long edge part is slightly elastically deformed toward the direction of tension, this one long edge part is not recessed depending on the tension of the belt. Thus, the belt does not come together to the recessed part of the one long edge part, either. As mentioned above, since the width of the belt is properly maintained in the one long edge part, the tension of the belt is evenly transmitted to the one long edge part. Consequently, the durability of the belt and the seat belt anchorage plate can be improved and safety can be improved owing to the improvement of their durability.

Further, where the belt is formed by pressing and flattening a tubular member in a flat shape, the belt is preferably curved so as to be folded along the central line in its longitudinal direction in order to maintain the flattened shape of the belt. Also when the belt is inserted into the slot while it is curved in such a manner, both the end parts at the right and left sides of the belt hardly strike against both the end parts of the one long edge parts, since the central part of the one long edge part is so formed as to swell and the curved shape of the belt substantially coincides with the shape of one long edge part. Additionally, rounded and expanded parts at both the ends of the also hardly strike against the one long edge part. Therefore, the belt can be easily inserted into the slot.

Since the other long edge part opposed to one long edge part is so formed as to extend along the one long edge part, the configuration of the one or the other, long edge part substantially correspond to that of the belt curved as stated above. Thus, the belt can be more easily inserted into the slot than in the case mentioned above.

Particularly, since short edge parts through which the one long edge part is connected to the other long edge part are formed in curved shapes of circular arc which are smoothly continued from one and the other long edge parts, the rounded and expanded parts at both the ends of the belt hardly collide with the short edge parts. Thus, the belt can be advantageously more readily inserted into the slot.

Since the one long edge part has a protrusion which protrudes from one surface side of the plate shaped member, the contact surface area of the belt abutting against the one long edge part is increased. As a result, the surface pressure of the belt can be reduced. Further, since the corner parts of the one long edge part are rounded along the direction in which the belt is folded back, the belt is prevented from breaking in the corner parts. Furthermore, since the corner parts are rounded and these corner parts do not need to undergo a coating work with vinyl chloride or polyethylene or the like, cost required for such a coating work can be reduced. That is, the cost can be lowered.

Since a protrusion which protrudes from the other surface of the plate shaped member is formed by bending a part of the plate shaped member from the one surface side to the other surface side of the plate shaped member, the protrusion can be projected greatly from the other surface side. Therefore, the area of the belt abutting against the one long edge part can be increased. In other words, surface pressure exerted on the belt from the one long edge part can be completely lowered. Therefore, the durability of the belt and the strength of the seat belt anchorage plate can be improved, and safety can be improved based on the improvement of their durability and strength. Further, since the corner parts of the one long edge part are rounded, the belt can be prevented from being broken in these corner parts. Additionally, since the corner parts are rounded and do not need to be subjected to a coating work with vinyl chloride or polyethylene or the like, cost necessary for such a coating work can be reduced. Namely, the cost can be lowered.

Since the one long edge part is formed so as to have one protrusion and the other protrusion which respectively protrude from one surface side and the other surface side of the plate shaped member, the contact surface area of the belt which abuts against the one long edge part is increased in some embodiments of the invention. As a result, the surface pressure of the belt can be further reduced.

Since the one long edge part is formed so as to have one protrusion and the other protrusion which respectively protrude from one surface side and the other surface side by bending a part of the plate shaped member from the one surface side to the other surface side of the plate shaped member and pressing the bent part to return to the one surface side, the area of a part against which the belt abuts can be increased in some embodiments of the invention. Consequently, the surface pressure of the folded-back part of the belt can be further reduced.

The short edge parts are also provided with a protrusion, so that the strength of the short edge parts can be increased. Therefore, even if the belt is gathered to the short edge part so that force is concentrated to the short edge part, the safety of the short edge part can be more improved than the past until the present. In addition, where a whole edge part except the one long edge part is also provided with a protrusion, the strength of an entire part around the slot can be improved.

Since the operational advantages as mentioned above can be exhibited, and the short edges are formed to be curved in a circular arc shape, the concentration of stress to the short edge parts can be relieved.

The contact surface area the belt which abuts against the one long edge part can be increased owing to the presence of the protrusion. As a result, the surface pressure of the belt can be reduced. Where the protrusions are formed so as to protrude from both the one surface side and the other surface side of the plate member, the surface pressure of the belt can be most reduced.

Since the corner parts of the one long edge part are rounded along the direction in which the belt is folded back, the belt can be prevented from being broken in these corner parts. Further, since the corner parts are rounded and they do not need to undergo a coating work with vinyl chloride or polyethylene or the like, expenses required for such a coating work can be reduced. That is, the cost can be lowered.

The amount of protrusion of the respective protrusions which are projected from the plate shaped member ranges from 15% to 60% as thick as the thickness of the plate shaped member, so that the contact surface area of the belt which abuts against the one long edge part can be increased. Such a magnification as 15% to 60% is enabled by forming the part of the slot by a bending work in some embodiments of the invention, or forming it by burring in other embodiments of the invention.

Since the sheared edge parts (burs) produced in a piercing step are removed in a surface pressing step, the protrusion can be clearly projected in a burring step and the corner parts of the protrusion can be finely formed in a curved surface forming step.

The edge part opposite to the protrusion in the slot can be smoothly rounded with a larger radius of curvature in a restriking step. Therefore, since the corner parts can be finished so as to be rounded in a series of press working steps for forming the seat belt anchorage plate, a finishing work or a coating work must not be carried out in another step. Accordingly, the cost can be reduced.

BRIEF DESCRIPTION OF DRAWINGS

FIG. 28A is a front view, FIG. 28B is a sectional view and FIG. 28C is a sectional view showing an alternative example of FIG. 28B.

FIG. 29A is a front view, FIG. 29B is a sectional view and FIG. 29C is a sectional view showing an alternative example of FIG. 29B.

FIG. 30A is a front view, FIG. 30B is a sectional view and FIG. 30C is a sectional view showing an alternative example of FIG. 30B.

FIG. 37A is a sectional view of the steel plate in the piercing step P1, FIG. 37B is a sectional view of the steel plate in the surface-pressing step P2, FIG. 37C is a sectional view of the steel plate in the burring step P3, FIG. 37D is a sectional view of the steel plate in the curved-surface forming step P4 and FIG. 37E is a sectional view of the steel plate in a restriking step P5.

BEST MODE FOR CARRYING OUT THE INVENTION

Embodiments of the present invention will be described hereinbelow with reference to FIGS. 1 to 37. Initially, referring to FIGS. 1 to 5, the first embodiment of the present invention will be described below.

Figure 5:
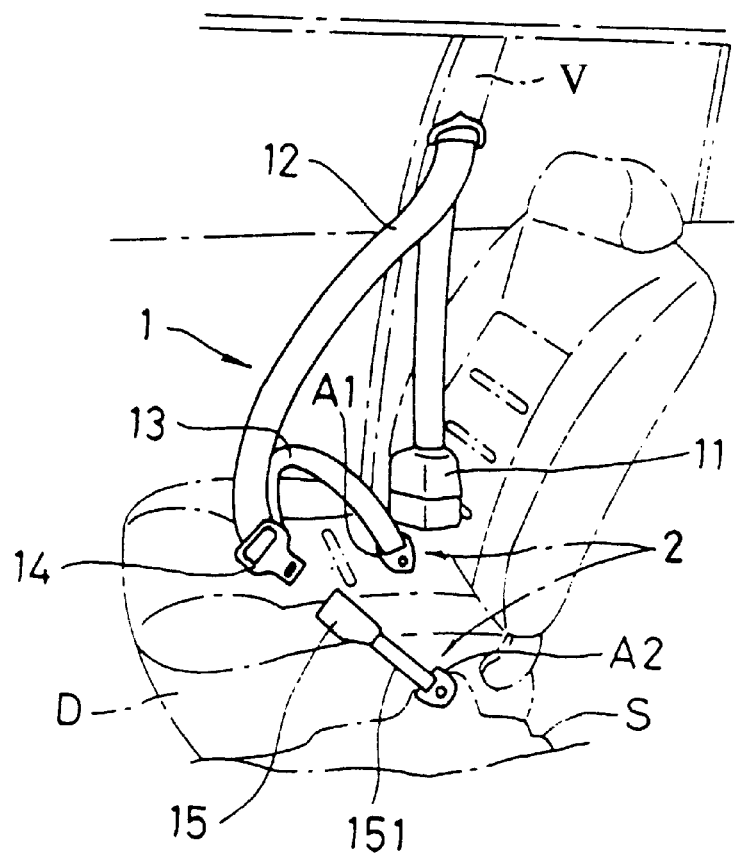
FIG. 5 is an explanatory view illustrating the seat belt anchorage plate in an automobile (it should be noted that the anchorage plates of FIG. 5 are mounted in an inverted orientation within the automobile as compared to the illustrations of FIGS. 1 and 2).

In FIG. 5, V designates the vehicle body of an automobile, D a driver's seat, and I a seat belt device. A retractor 11 for a shoulder belt is fixed to the vehicle body V. A shoulder belt 12 is connected to this retractor 11. A seat belt anchorage plate A1 is fixed to one side of the seat D in the vehicle body S. A waist belt 13 is connected to this seat belt anchorage plate A1. The shoulder belt 12 and waist belt 13 are formed with one belt, which is divided into the shoulder belt 12 in the retractor 11 side and the waist belt 13 in the seat belt anchorage plate A1 side by sandwiching a tongue clamp 14 therebetween as a border.

The above described tongue clamp 14 is detachably connected to a buckle 15 which is connected to another seat belt anchorage plate A2 through a connecting belt 151. This seat belt anchorage plate A2 is fixed to the vehicle body S opposite to that of the seat belt anchorage plate A1 by sandwiching the seat D therebetween. Since these seat belt anchorage plates A1 and A2 have substantially the same construction, the construction of the seat belt anchorage plate A1 will be specifically described using its reference symbols.

Figure 1:
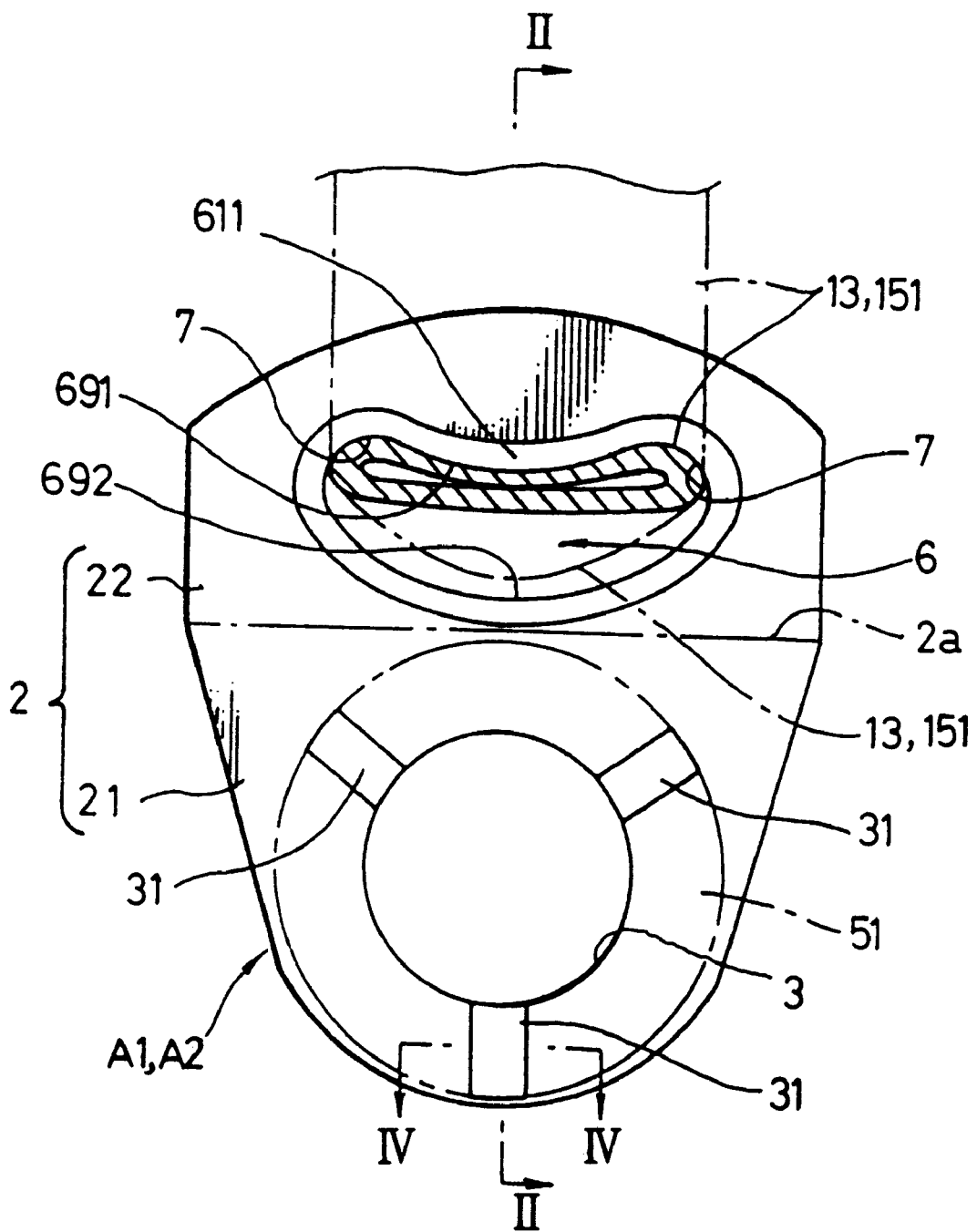
FIG. 1 is a front view of a seat belt anchorage plate illustrated as a first embodiment of the present invention.
Figure 2:
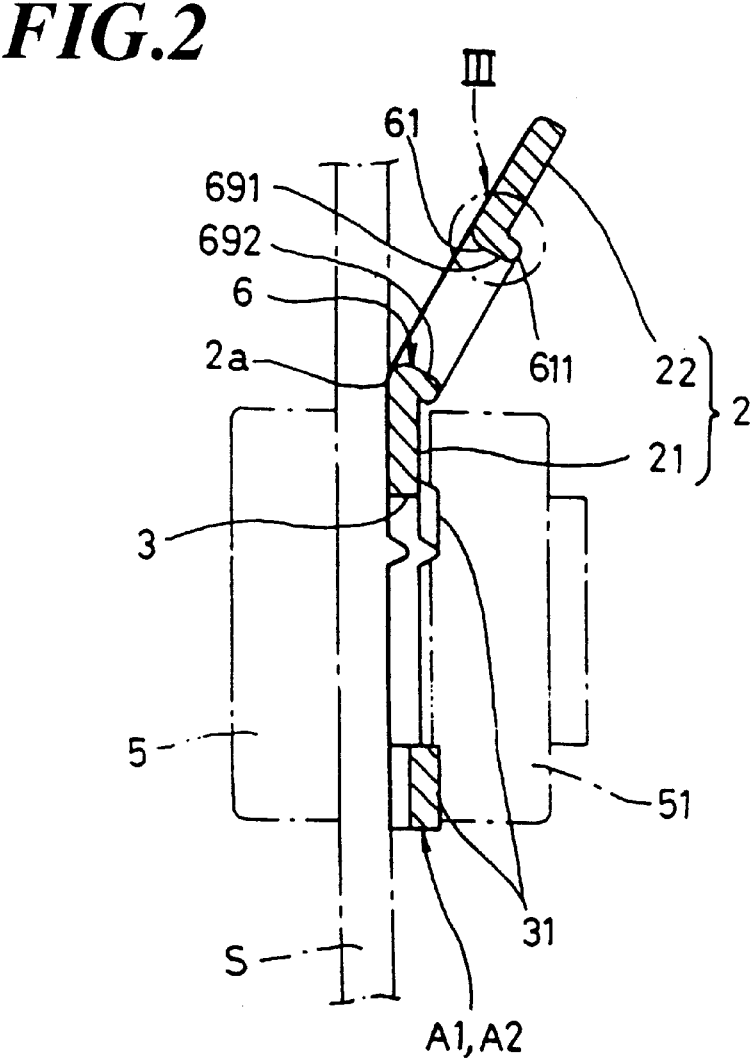
FIG. 2 is a sectional view of the seat belt anchorage plate taken along a line II—II in FIG. 1.

The seat belt anchorage plate A1 is made of a plate shaped base (plate shaped member) 2, and slightly bent at a bending part 2a to be formed in a "<" shape, as illustrated in FIGS. 1 to 2. The plate shaped base 2 is constituted of a fixing plate part 21 in one side and a belt winding plate part 22 in the other side which sandwich this bending part 2a therebetween as a border. In the fixing plate part 21, a bolt hole 3 is formed. A plurality of curved protrusions 31 are formed at equal intervals in the radial direction of the peripheral edge part of the bolt hole 3 (in the present embodiment, three protrusions are formed). The respective curved protrusions 31 are projected from the one surface side to the other surface side of the base 2 by a press working. The number of the curved protrusions is not limited and the protrusions may be finely radially provided like a chrysanthemum seat.

As shown in FIG. 2, a fixing bolt 5 is inserted into the bolt hole 3. The base 2 is designed to be fixed to the vehicle body S by means of this bolt 5 and a nut 51. At this time, the above stated curved protrusions 31 serve as means similar to a spring washer as well as locking means for stopping rotation due to the increase of friction. Thus, the curved protrusions are useful for assuredly fixing the base 2 to the vehicle body S. Further, the spring washer which has been conventionally usually employed does not need to be used. Therefore, the number of parts required can be reduced.

On the other hand, a slot 6 for inserting and connecting one end part of the waist belt 13 is formed on the belt winding plate part 22 of the base 2. The waist belt 13 is folded back in one long edge part 691 of the slot 6 so that tension is exerted on the one long edge part 691. The one long edge part 691 bearing the tension is curved at a central part in its longitudinal direction so as to protrude in the direction opposite to that on which the tension is exerted. The waist belt 13 employs a belt similar to one shown in the conventional example, a band shaped and flattened thin woven fabric into which polyester fibers are woven. One end part of the belt 13 in its longitudinal direction is folded back in the one long edge part 691. The folded-back part is sewn onto the waist belt 13 so that it is fixed to the base 2.

Further, the other long edge part 692 opposed to the one long edge part 691 is also curved in the direction similar to that of the one long edge part 691. Parts through which the one long edge part is connected to the other long edge part 692 are short edge parts 7 and 7 formed in smoothly continued circular arc shapes.

Figure 3:
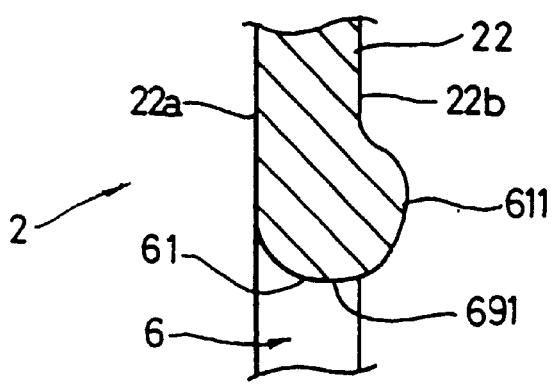
FIG. 3 is an enlarged view of the seat belt anchorage plate in a part III shown in FIG. 2.
Figure 4:
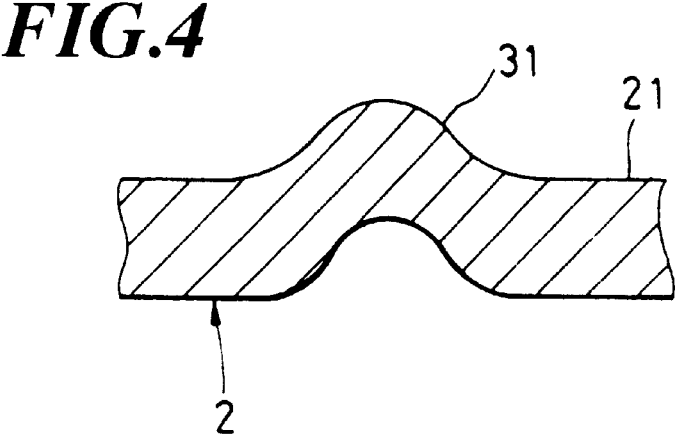
FIG. 4 is a sectional view of the seat belt anchorage plate taken along a line IV—IV in FIG. 1.

The slot 6 comprising one and the other long edge parts 691-8, 692 and the short edge parts (not shown) are formed as illustrated in FIG. 3. Specifically stated, the slot 6 has a circular arc shaped inner surface 61 formed from one surface 22a side of the base 2 to the interior of the slot 6 and a protrusion 611 protruding in a circular arc shape which is formed from the interior of the slot 6 to the other surface 22b side. The inner surface 61 and protrusion 611 are formed by a press-working.

In the seat belt anchorage plate for a seat belt device constructed as mentioned above, since the central part of the one long edge part 691 is curved so as to protrude in the direction opposite to the tension of the waist belt 1.3, even when the one long edge part 691 is elastically deformed in the direction of the tension force because of the tension force which loads on the long edge part 691 according to emergency stop of the automotive vehicle, the long edge part 691 is not deformed in a recessed shape in the direction of tension. Thus, since the long edge part 691 does not deform as a concave shape by elastic deformation, the belt does not gather to the recessed part and the width of the waist belt 13 is usually maintained to a normal width. Consequently, since the tension of the belt 13 is constantly uniformly distributed on the one long edge part 691, the strength performance of the waist belt 13 and the seat belt anchorage plate A1 and safety can be improved depending on the improvement of their strength.

Further, since the other long edge part 692 is also curved in a similar way to the one long edge part 691, when the waist belt 13 is inserted into the slot 6 while it is curved so as to be folded back along a central line in its longitudinal direction in order to maintain the flat state of the waist belt 13,—the configurations of the one and the other long edge parts 691 and 692 substantially correspond to the curved configuration of the waist belt 13. Thus, the waist belt 13 can be extremely easily inserted into the slot 6.

Since the connecting parts of the one and the other long edge parts 691 and 692, namely, the short edge parts 7 and 7 are shaped in smooth circular arc in configuration, even when both the end parts of the waist belt 13 along its longitudinal direction are expanded in a circular arc shape, the expanded parts do not collide with the short edge parts 7 and 7. Therefore, the waist belt 13 can be advantageously readily inserted into the slot 6. In addition, both the end parts of the waist belt 13 can fit in the short edge parts 7 and 7. When tension acts on the waist belt 13, the belt 13 can be stably held in its prescribed position of the slot 6.

Further, the slot 6 has a circular arc shaped inner surface 61 from the one surface 22a side of the base 2 to the interior of the slot 6 and a protrusion 611 protruding in a circular arc shape from the interior of the slot 6 to the other surface 22b side. Therefore, such a possibility can be removed that the waist belt 13 folded back in the one long edge part 691 collides with the corner parts and then is cut. Additionally, since an area of the waist belt 13 which abuts against the one long edge part 691 is increased due to the existence of the protrusion 611, surface pressure exerted on the waist belt 13 can be decreased and the durability and reliability of the waist belt 13 can be improved.

Still further, since the protrusion 61-1 is formed on the entire periphery of the slot 6, strength in the periphery of the slot is improved and the strength of the whole seat belt anchorage plate A1 can be improved. Particularly, since the short edge parts 7 can be strengthened, even if the end part of the waist belt 13 gather to the short edge part 7 and force is concentrated on the short edge part 7, the safety of the short edge part can be improved more than before.

In addition to the above, when tension is exerted upon the waist belt 13, the waist belt 13 folded back in the one long edge part 691 comes into tight contact with the one long edge part 691. More specifically stated, the folded back part of the waist belt 13 is curved in a configuration similar to that of the one long edge part 691 and the central part of the belt in its lateral direction expands. Therefore, the waist belt 13 hardly slides in its lateral direction along the one long edge part 691. Accordingly, even when the direction of the tension of the waist belt 13 does not coincide with the direction perpendicular to the one long edge part 691, the waist belt 13 does not slide sideward along the one long edge part 691 nor gather to the end part of the slot 6.

Further, since the central part of the waist belt 13 in the direction of its width-swells in a similar manner to the one long edge part 691, the waist belt 13 is always expanded in its lateral direction. Accordingly, even when the waist belt 13 itself tends to thinly converge upon exertion of tension on the waist belt 13. The waist belt 13 is maintained in its original expanded state on the one long edge part 691. That is, the waist belt 13 does not gather to one part on the one long edge part 691. As mentioned above, since the width of the belt folded back part is appropriately maintained, the tension of the belt is uniformly transmitted to the one long edge part. Consequently, not only the durability of the belt and the strength performance of the seat belt anchorage plate but also safety can be improved.

In the next place, referring to FIGS. 6A–6D, the second embodiment of the present invention will be described. While the second embodiment is different from the first embodiment in that the shapes of the respective slots 6 are different from each other, the second embodiment is similar to the first embodiment in terms of other points. Therefore, the explanation therefor will be omitted.

Figure 6A:
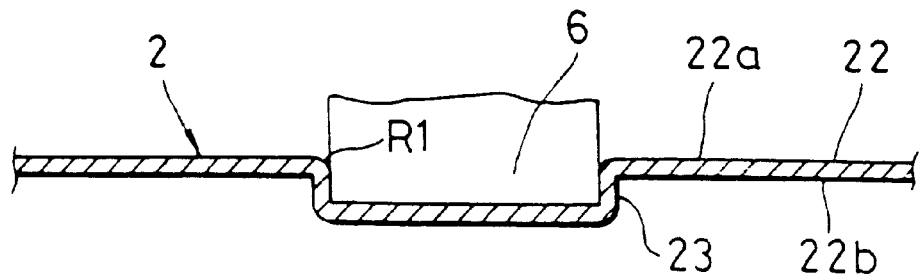
FIGS. 6A, 6B, 6C and 6D are sectional views of a seat belt anchorage plate shown as a second embodiment of the present invention.
Figure 6B:
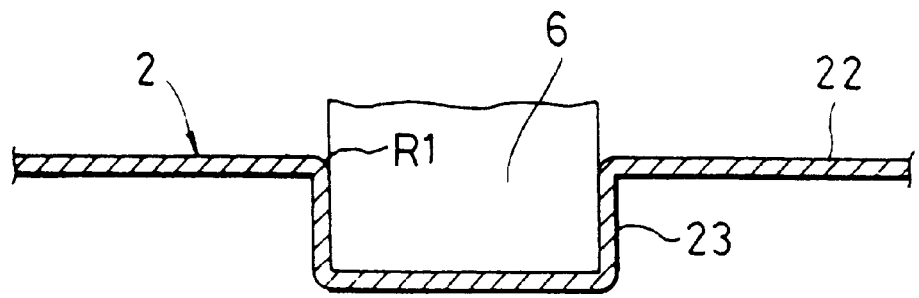
Figure 6C:
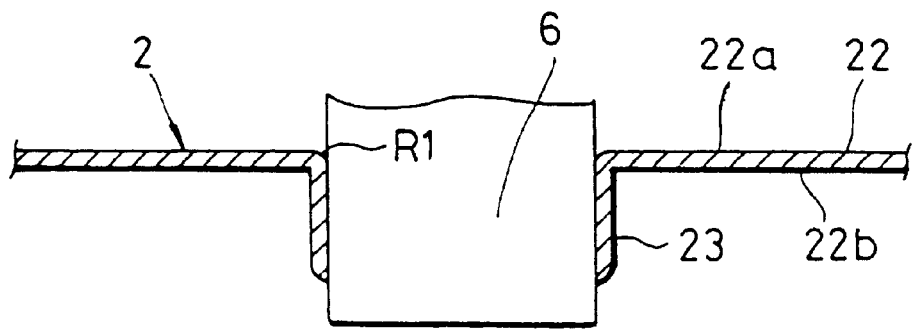
Figure 6D:
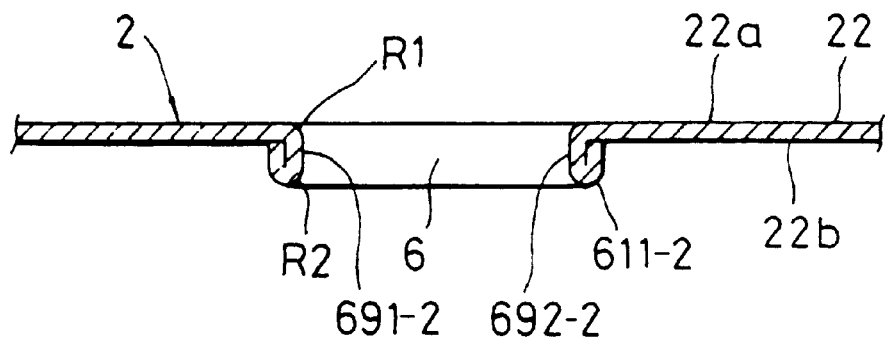

Specifically, in the case of a slot 6 comprising one and the other long edge parts 691-2, 692-2 and short edge parts (not shown), a part corresponding to the slot 6 is formed in a recessed shape by a plurality of times of pressworkings, as illustrated in FIGS. 6A, 6B, and 6C. Then, the bottom of the recessed part is punched out to be removed so that a protruding piece 23 which protrudes from one surface 22a side of a base 2 to the other surface 22b side is formed. At this time, a curved surface R1 is formed which is curved in a circular arc shape from the one surface 22a to the inner surface of the protruding piece 23. As can be seen in FIG. 6D, the end part of the protruding piece 23 is folded back by a press-working (curling work) so that it further comes near the other surface 22b. Thus, a protrusion 611-2 which largely protrudes to the other surface 22b side is formed and a curved surface R2 is formed which is smoothly curled from the inner surface of the slot 6 to the protrusion 611-2.

In a seat belt anchorage plate for a seat belt device constructed as described above, since the base 2 is subjected to a drawing work so that the slot 6 is formed, the height of the protrusion 611-2 is particularly increased and an area of one long edge part 691-2 against which a waist belt 13 abuts is larger than that of the first embodiment. Consequently, surface pressure exerted on the waist belt 13 is decreased and the durability of the waist belt 13 and safety can be furthermore improved. In addition, the curved surfaces R1 and R2 are configured respectively in the corner parts of the one long edge part 691-2 in which the waist belt 13 is folded, no possibility may arise that the waist belt 13 is worn and torn on the one long edge part 691-2. Other operational effects exhibited in the second embodiment are similar to those of the first embodiment.

Now, a third embodiment of the present invention will be described with reference to FIGS. 7 to 22. Components similar to those in the first embodiment shown in FIGS. 1 to 5 are affixed with the same reference symbols; however, the explanation therefor will be simplified.

Figure 7:
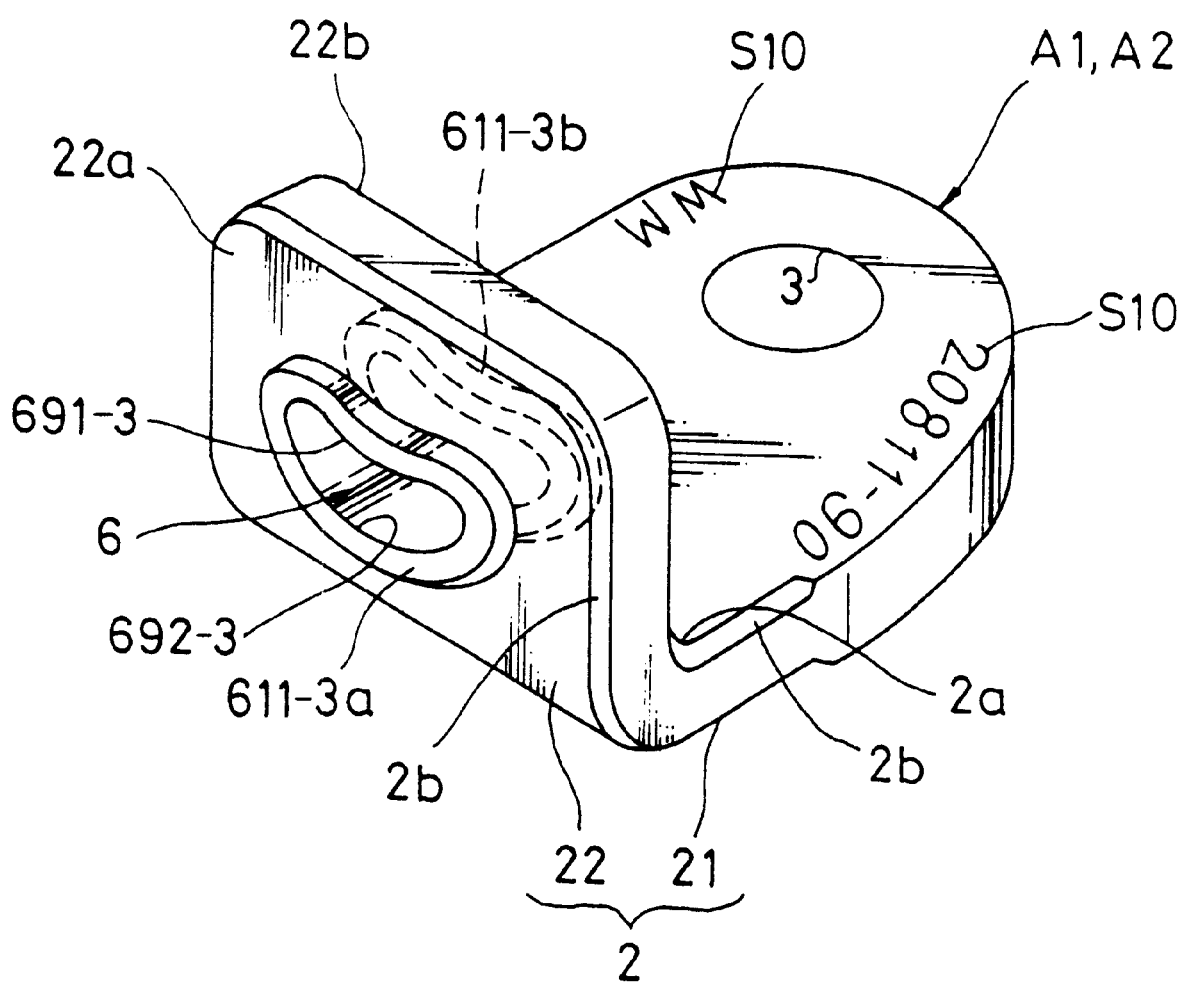
FIG. 7 is a perspective view of a seat belt anchorage plate shown as a third embodiment of the present invention.

A seat belt anchorage plate A1, as illustrated in FIG. 7, is bent substantially at right angles with a belt winding plate part 22 in a bent part 2a. A slot 6 is formed on the belt winding plate part 22. This slot 6 is provided with one protrusion 611-3a and the other protrusion 611-3b which respectively protrude to one surface 22a side and the other surface 22b side. In other words, the slot 6 has an inner surface whose length is increased due to the one protrusion 611-3a and the other protrusion 611-3b, so that the area of along edge part 691 against which a waist belt 13 abuts is increased.

Further, the one protrusion 611-3a and the other protrusion 611-3b are respectively projected to the one surface 22a side and the other surface 22b side in such a manner that a protrusion protruding from the other surface 22b is formed by bending (burring) a part of the base 2 from the one surface 22a side of the base 2 to the other surface 22b side and moving this protrusion to the one surface 22a side by a press. Consequently, the amount of protrusion of the one protrusion 611-3a and the other protrusion 611-3b are respectively determined based on the amount of initial bending (amount of protruding)of the base 2. The respective protrusions 611-3a and 611-3b have their end parts rounded. That is, in the case of one long edge part 691-3, its corner parts are rounded along the direction in which the waist belt 13 is folded back. In addition, C chamfered parts 2b are formed on the end parts of the outer periphery of the base 2. A marking S10 is stamped on the periphery of a bolt hole 3 on the base 2.

In the seat belt anchorage plate A1 constructed as stated above, since the amount of respective protrusions of the one protrusion 611-3a and the other protrusion 611-3b can be increased depending on the amount of bending (amount of protruding) of the base 2 the area of a part in the one long edge part 691-3 against which the waist belt 13 abuts can be increased up to a satisfactory value as required. Therefore, surface pressure exerted upon the waist belt 13 from the one long edge part 691-3 can be completely lowered and safety can be improved depending on the improvement of the durability of the waist belt 13 and the strength performance of the seat belt anchorage plate A1.

Still further, since the one protrusion 611-3a and the other protrusion 611-3b are formed to be rounded and the corner parts of the protrusions are rounded along the direction in which the waist belt 13 is folded back on the long edge part 691, the waist belt 13 can be prevented from being broken on the protrusions. Besides, since the corner parts of the protrusions are rounded and the protrusions do not need to undergo a coating work with vinyl chloride or polyethylene or the like, expenses necessary for such a coating work can be reduced, namely, the cost can be reduced.

Next, a method for manufacturing the seat belt anchorage plate A1 composed as stated above will be described below.

Figure 8:
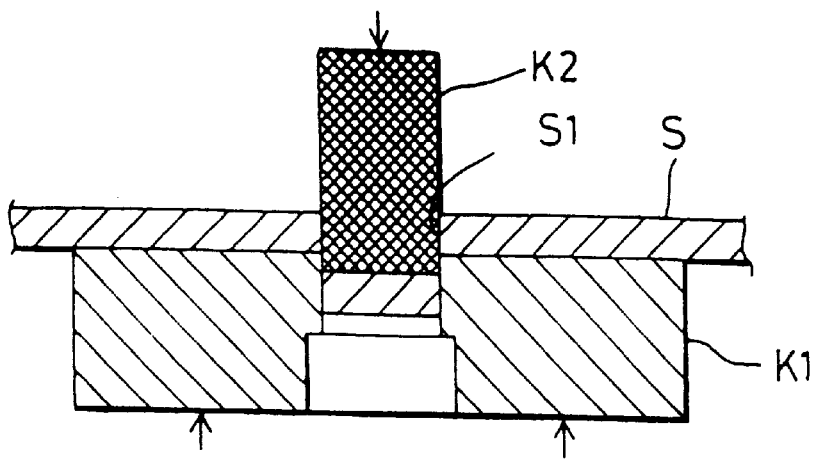
FIG. 8 is an explanatory view showing a first manufacturing step when the seat belt anchorage plate is manufactured.
Figure 9:
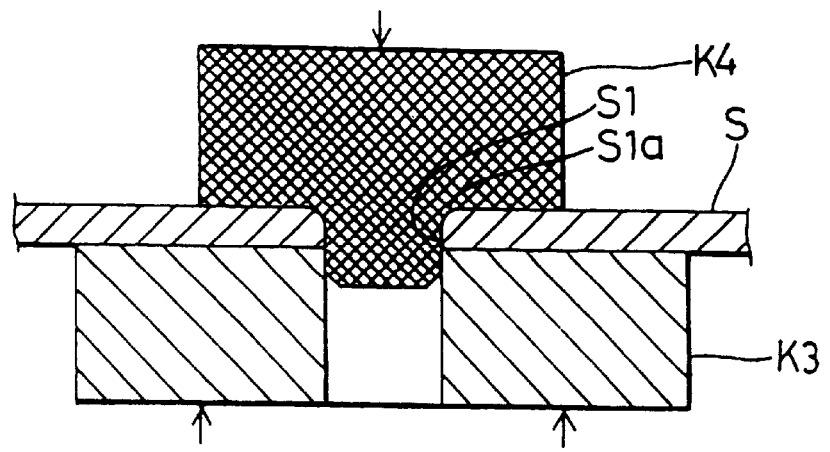
FIG. 9 is an explanatory view showing a second manufacturing step when the seat belt anchorage plate is manufactured.
Figure 10:
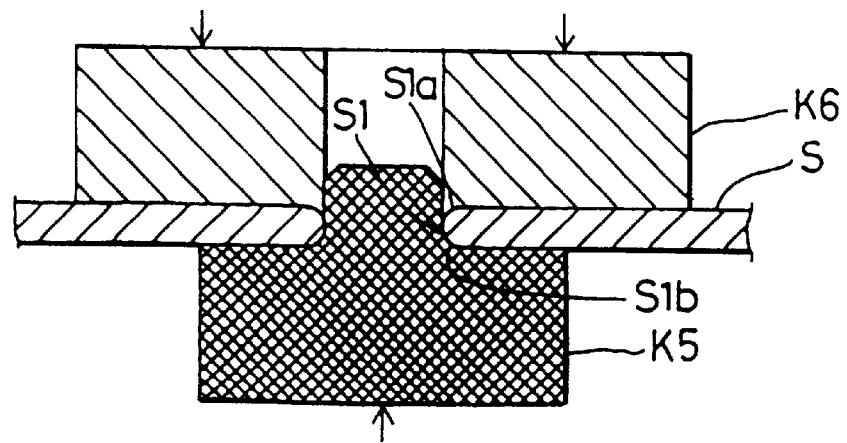
FIG. 10 is an explanatory view showing a third manufacturing step when the seat belt anchorage plate is manufactured.

Initially, as a first step illustrated in FIG. 8, a first lower hole S1 for forming a slot 6 is bored on a steel plate S as the raw material of a base 2 using a metal mold K1 and a punch K2. Then, in a second step as illustrated in FIG. 9, a circular arc shaped roundness S1a is formed from the upper part of the first preliminary hole S1 to the upper surface of the steel plate S, using a metal mold K3 and a metal mold K4. Further, in a third step as shown in FIG. 10, a circular arc shaped roundness S1b is formed from the lower part of the first preliminary hole S1 to the lower surface of the steel plate S, using a metal mold K5 and a metal mold K6.

Figure 11:
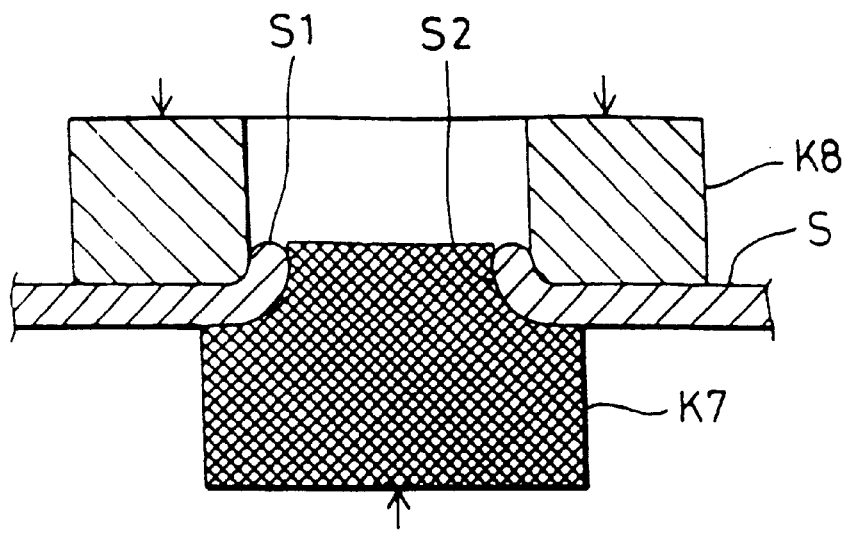
FIG. 11 is an explanatory view showing a fourth manufacturing step when the seat belt anchorage plate is manufactured.
Figure 12:
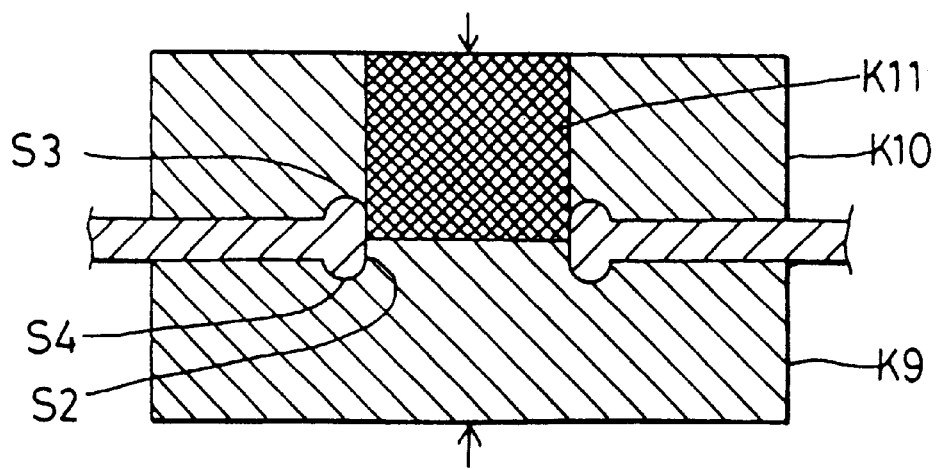
FIG. 12 is an explanatory view showing a fifth manufacturing step when the seat belt anchorage plate is manufactured.

In-the next place, in a fourth step illustrated in FIG. 11, the part of the first preliminary hole S1 is curved above the steel plate S (burring work), using a metal mold K7 and a metal mold K8 so that a second preliminary hole S2 is formed. Then, in a fifth step as illustrated in FIG. 12, the part of the second preliminary hole S2 which protrudes upward is surface-pressed downward by using a metal mold K9, a metal mold K10 and a metal mold K11 so that a protrusion S3 and a protrusion S4 are formed which protrude with substantially the same height from the upper and lower surfaces of the steel plate S.

Figure 13:
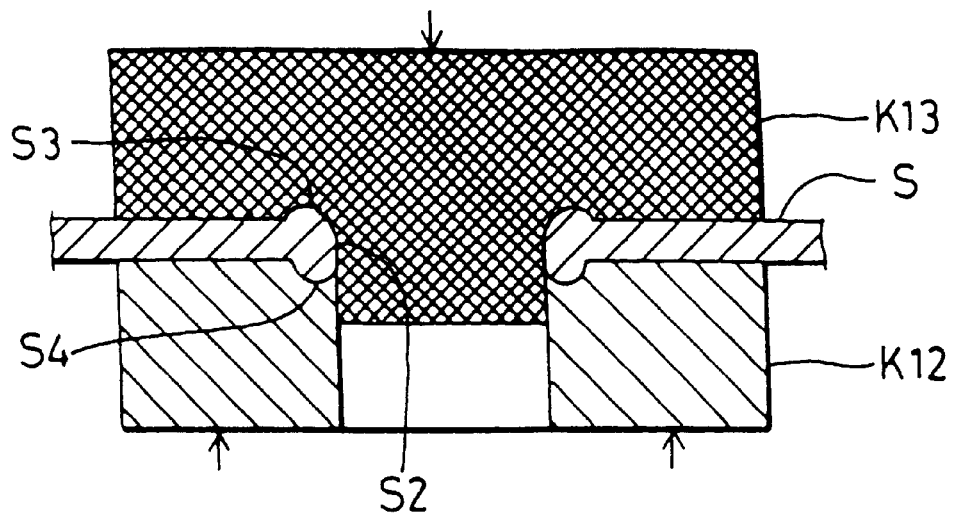
FIG. 13 is an explanatory view showing a sixth manufacturing step when the seat belt anchorage plate is manufactured.
Figure 14:
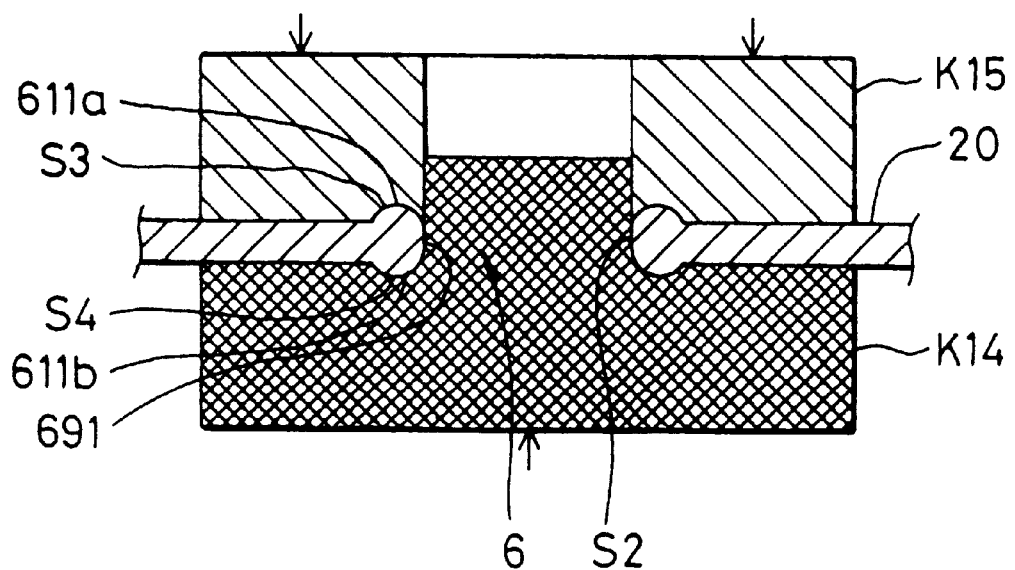
FIG. 14 is an explanatory view showing a seventh manufacturing step when the seat belt anchorage plate is manufactured.

Further, in a sixth step as shown in FIG. 13, the protrusion S3 which protrudes toward the upper side is finished by using a metal mold K12 and a metal mold K13 so as to have an entirely smooth curved surface (restriking work). At this time, the surface of the second preliminary hole S2 is finely finished. Then, in a seventh step as shown in FIG. 14, the protrusion S4 which protrudes toward the lower side is finished by using a metal mold K14 and a metal mold K15 so as to have an entirely smooth curved surface (restriking work). At this time, the surface of the second preliminary hole S2 is also finely finished. Thus, a slot 6 is formed with the second preliminary hole S2 finished in such a way and one protrusion 611a and the other protrusion 611a are formed with the protrusions S3 and S4.

Figure 15:
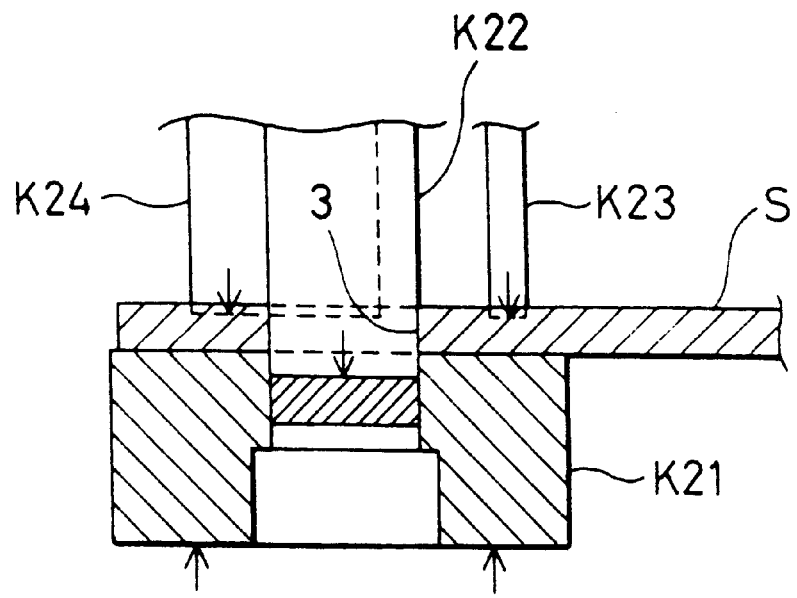
FIG. 15 is an explanatory view showing an eighth manufacturing step when the seat belt anchorage plate is manufactured.
Figure 16:
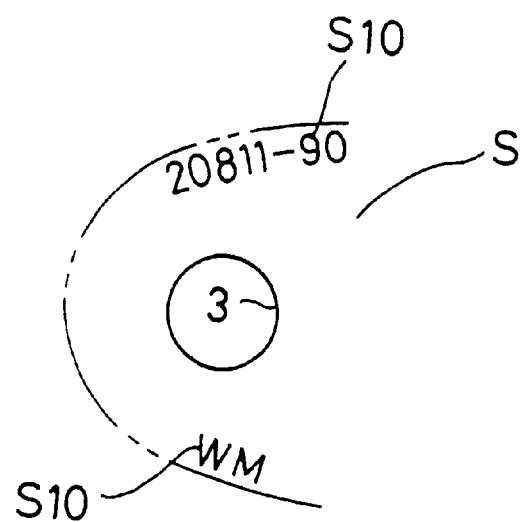
FIG. 16 is an explanatory view showing the shape of the seat belt anchorage plate after the eighth manufacturing step.
Figure 17:
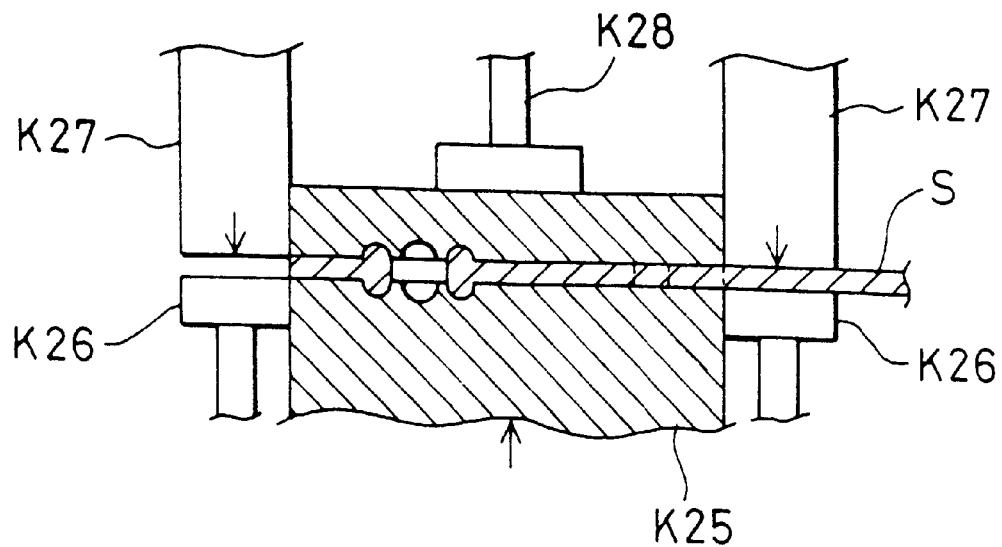
FIG. 17 is an explanatory view showing a ninth manufacturing step when the seat belt anchorage plate is manufactured.
Figure 18:
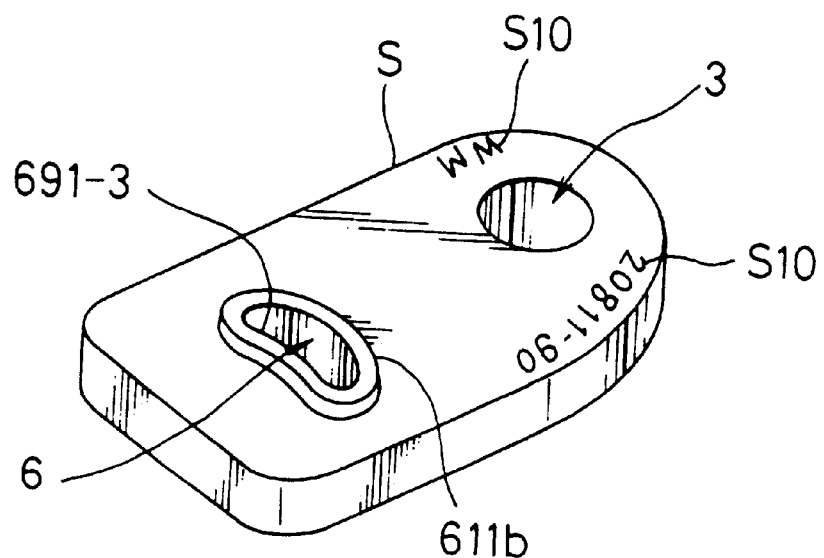
FIG. 18 is an explanatory view showing the shape of the seat belt anchorage plate after the ninth manufacturing step.
Figure 19:
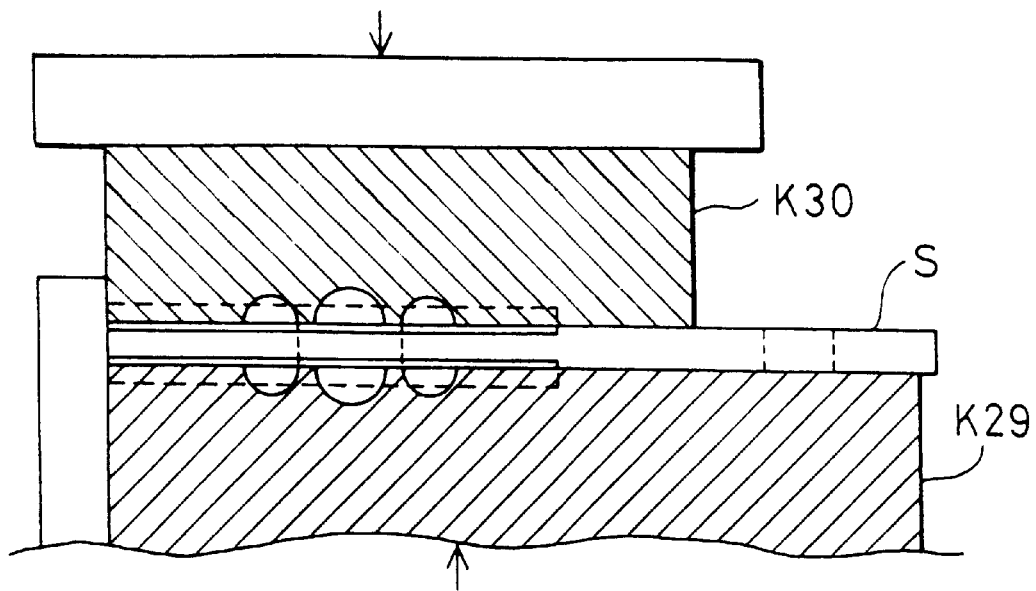
FIG. 19 is an explanatory view showing a tenth manufacturing step when the seat belt anchorage plate is manufactured.
Figure 20:
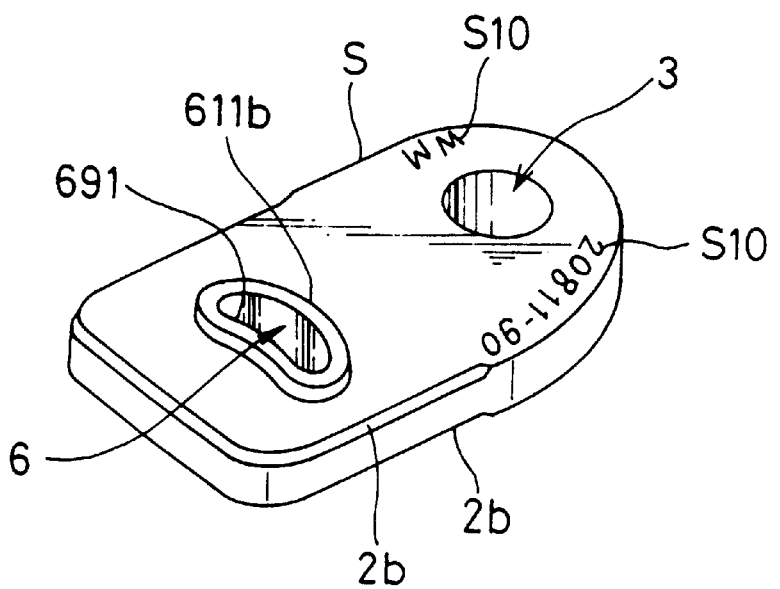
FIG. 20 is an explanatory view showing the shape of the seat belt anchorage plate after the tenth manufacturing step.
Figure 21:
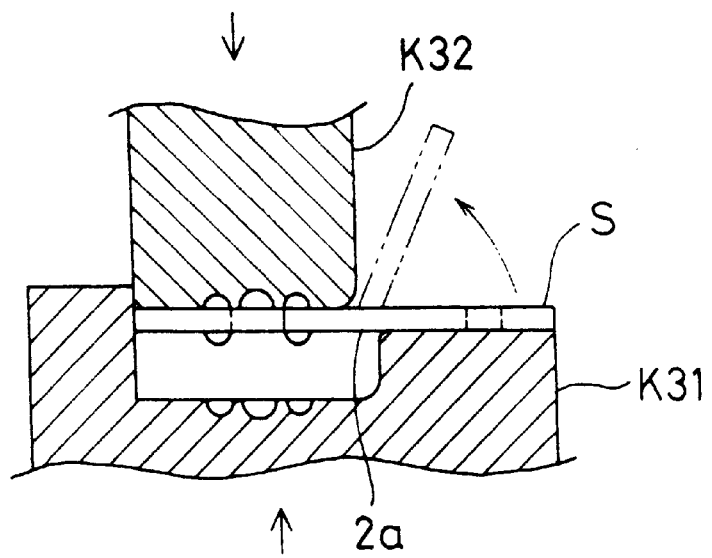
FIG. 21 is an explanatory view showing an eleventh manufacturing step when the seat belt anchorage plate is manufactured.
Figure 22:
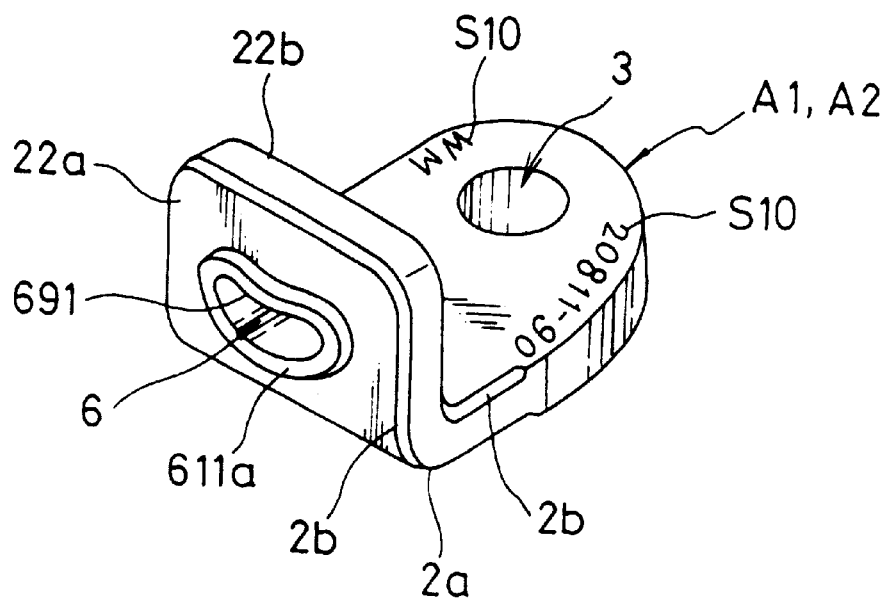
FIG. 22 is an explanatory view showing the shape of the seat belt anchorage plate after the eleventh manufacturing step.

Next, in an eighth step shown in FIG. 15, a bolt hole 3 is bored on the steel plate S and markings are stamped on the periphery of the bolt hole 3 by using a metal mold K21, a punch K22 and marking presses K23 and K24. Thus, as illustrated in FIG. 16, a product is in a state in which the bolt hole 3 is bored and the markings S10 are stamped. Further, in a ninth step as shown in FIG. 17, the outer periphery of a seat belt anchorage plate is cut (trimming work) by using a metal mold K25, metal molds K26 and metal molds K27. At this time, since the cut part of the steel plate S enters the metal molds K27, it is pushed out to be ejected by an ejector 28. In this way, a product with a configuration similar to the seat belt anchorage plate shown in FIG. 18 is obtained. Then, In a tenth step as illustrated in FIG. 19. a C-shape chamfered part 2b is formed by using a metal mold K29 and a metal mold K30. Thus, the C-shape chamfered part 2b is formed on the seat belt anchorage plate as can be seen in FIG. 20. Then, in an eleventh step as illustrated in FIG. 21, the steel plate S which forms a seat belt anchorage plate is bent substantially at right angles with the rest of the steel plate S along a bent part 2*a* by employing a metal mold K31 and a metal mold K32. Thus, a seat belt anchorage plate A1 as shown in FIG. 22 is completed.

As mentioned above, the seat belt anchorage plate A1 is formed with the steel plate S by press-workings. Although the manufacturing method of the seat belt anchorage plate has been divided into the eleven steps and these steps have been individually explained according to the above description, this manufacturing method is actually divided into still more steps so that the material is gradually deformed until the seat belt anchorage plate is formed therewith.

According to the above described third embodiment, although the protrusions protrude on both the one surface 22*a* side and the other surface 22*b* side of the base 2, the protrusion may only protrude either on one surface 22*a* or on the other surface 22*b*. A method for forming the protrusion protruding only on one side may be achieved by carrying out fifth to seventh steps shown in FIGS. 23 to 25 after the fourth step shown in FIG. 11.

Figure 23:
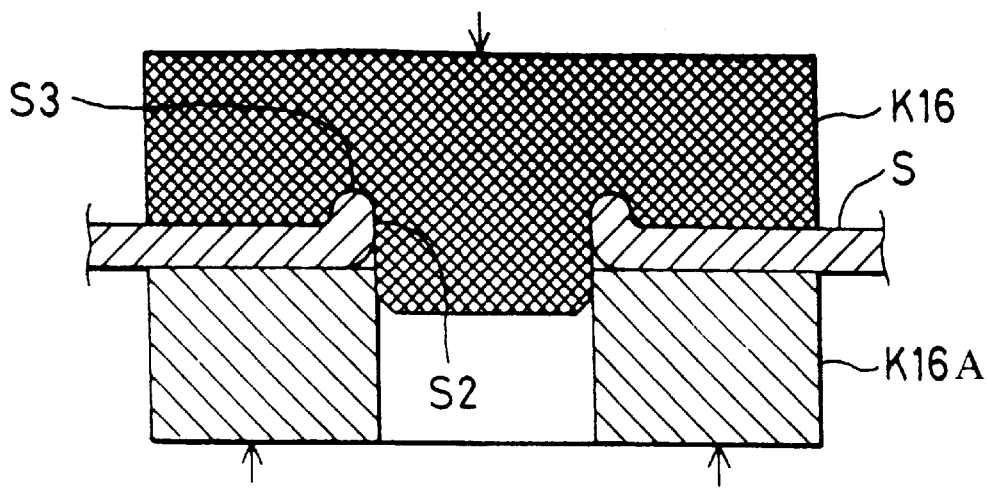
FIG. 23 is an explanatory view showing a fifth manufacturing step when manufacturing a seat belt anchorage plate which is illustrated as an alternative example of a third embodiment.

Specifically, after the part of the first lower hole S1 is curved above the steel plate S so that the second preliminary hole S2 is formed according to the fourth step illustrated in FIG. 11, in a fifth step as shown in FIG. 23, the part of the second preliminary hole S2 which protrudes to the upper side is surface-pressed to the lower side by using a metal mold K16A and a metal mold K16. Thus, a protrusion S3 is formed which protrudes with a substantially constant height from the upper surface of the steel plate S.

Figure 24:
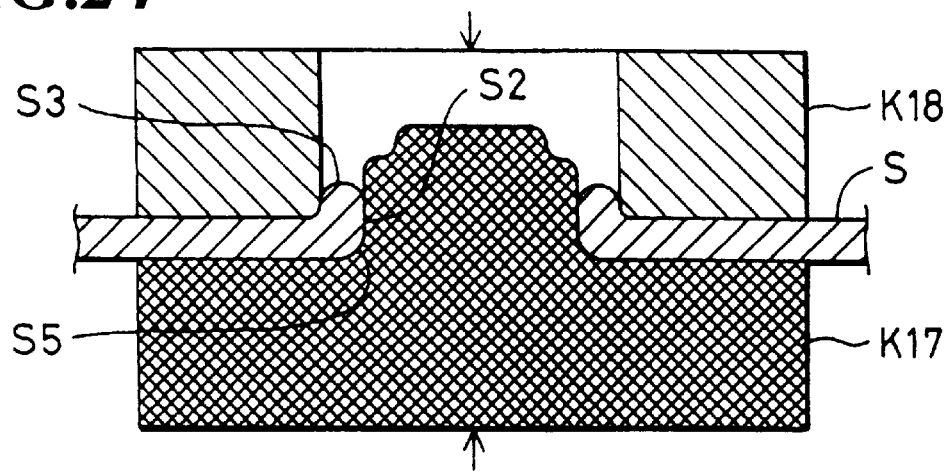
FIG. 24 is an explanatory view showing a sixth manufacturing step when the seat belt anchorage plate is manufactured.
Figure 25:
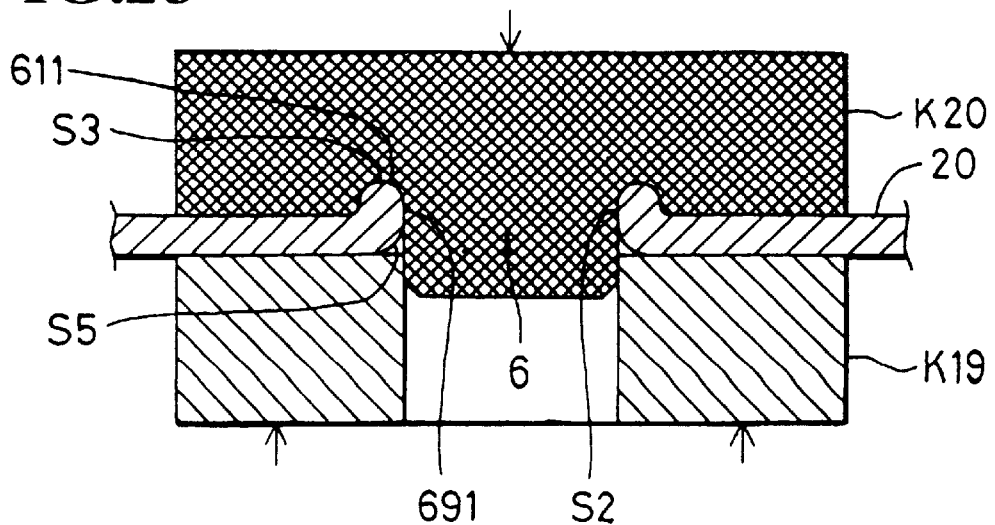
FIG. 25 is an explanatory view showing a seventh manufacturing step when the seat belt anchorage plate is manufactured.
Figure 26:
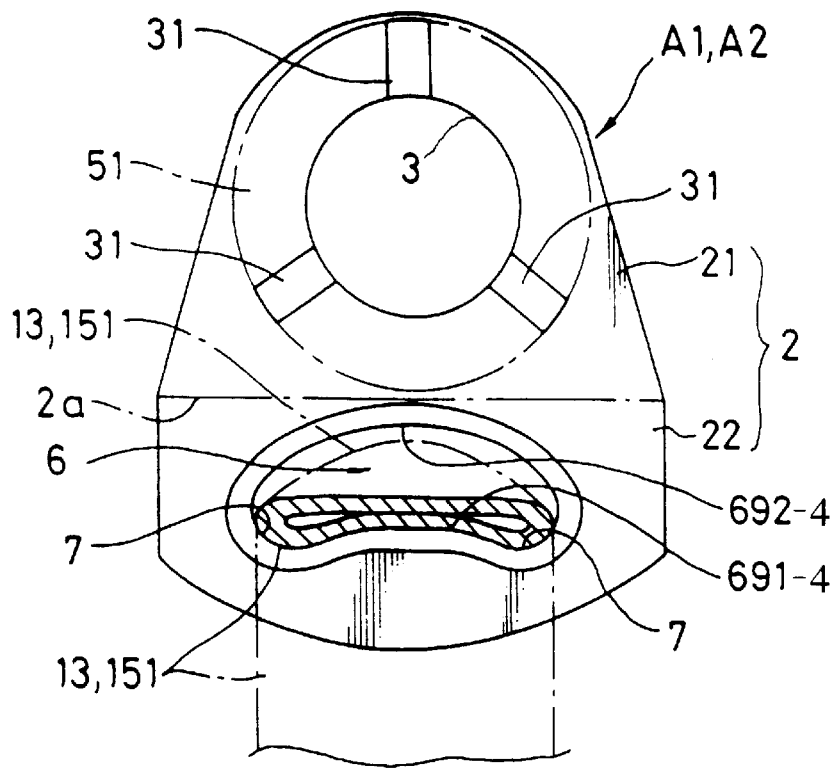
FIG. 26 is a front view of a seat belt anchorage plate illustrated as an alternative example of the first embodiment, the second embodiment and the third embodiment.
Figure 27:
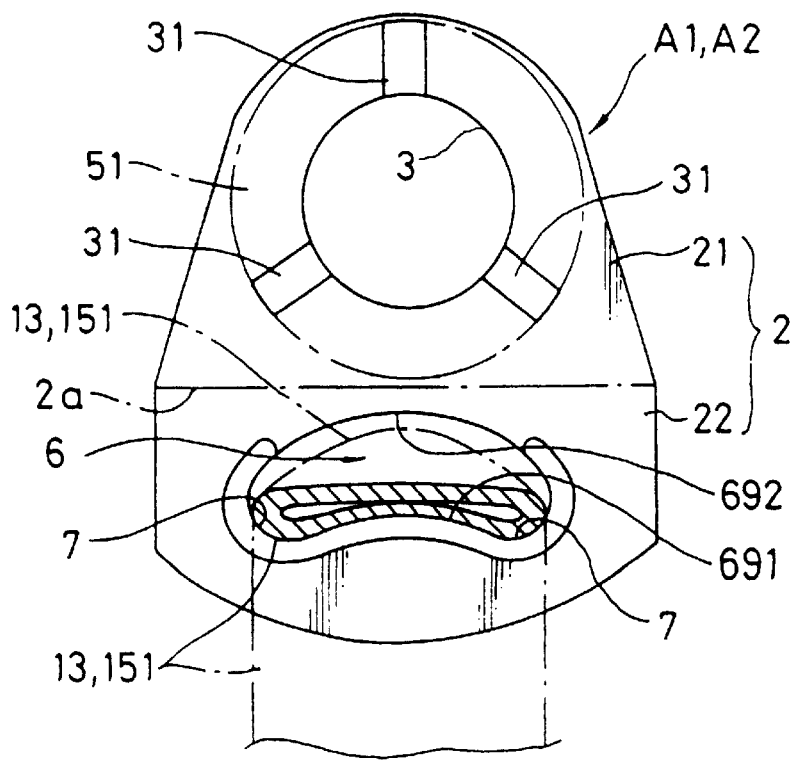
FIG. 27 is a front view of a seat belt anchorage plate illustrated as an alternative example of the first embodiment, the second embodiment and the third embodiment.

Additionally stated, in a sixth step as illustrated in FIG. 24, an edge S5 opposite to the protrusion S3 protruding to the upper side is finished so as to have a smooth curved surface by employing a metal mold K17 and a metal mold K18. At this time, the surface of the second preliminary hole 2 is also clearly finished. Then, in a seventh step as illustrated in FIG. 25, the protrusion S3 protruding to the upper side is subjected to a finishing work so as to have an entirely smooth curved surface by using a metal mold K19 and a metal mold K20. At this time, the surface of the second preliminary hole S2 is also finely cleaned. Thus, a slot 6 is formed with the second preliminary hole S2 finished in this way, and a protrusion 611 protruding, for example, to the other surface 22*b* side of the seat belt anchorage plate A1 is formed with the protrusion S3.

While the constructions of the seat belt anchorage plate A1 and the waist belt 13 have been described in detail in the above stated first to third embodiments, the constructions of seat belt anchorage plate A2 and a connecting belt 151 are same as those of the seat belt anchorage plate A1 and the waist belt 13. Further, the belt is not limited to the waist belt 13 or the connecting belt 151, but may include a shoulder belt 12 or other belts. Still further, according to the respective embodiments mentioned above, although the belt is formed by flattening a tubular one, it should be noted that a belt simply formed in a flat plate shape is employed.

Still further, although the other long edge part 692-3 has been curved in configuration in a similar way to the one long edge part 691-3, the other long edge part 692-3 may be formed in a linear shape or other shape. In this case, the other long edge part 692-3 is preferably formed to be curved substantially similarly to the one long edge part 691-3 so that the belt can be easily inserted into the slot.

In addition, although the protrusion 611-3 has been formed entirely on the slot 6, it may be provided only on the one long edge part 691, that is, a part against which the waist belt 13 abuts. Further, although the short edge parts 7 do not necessarily need to be configured in a circular arc shape, they are preferably formed in a curved circular arc shape so that the waist bolt 13 or the like is inserted into the slot and stress concentration exerted on these parts is mitigated.

Additionally, although the one or the other long edge parts 691 or 692 in the second embodiment is provided with curved surfaces R1 and R2 only at both end parts thereof, the whole inner surface of the long edge part including both the end parts may be formed with a curved surface in a circular arc shape or an elliptical shape or the like.

Furthermore, although the one long edge part 691 has its central part in its longitudinal direction curved to protrude in the direction opposite to the direction to which tension is applied, it is to be noted that this long edge part may be formed so as to expand, in the direction opposite to that of the tension of the belt, from its ends to its central part in its longitudinal direction. In other words, if the central part of the one long edge part 691 in its longitudinal direction expands relative to both the ends thereof, the central part may be in a flattened state.

Now, referring to FIGS. 28A, 28B and 28C, a fourth embodiment of the present invention will be described below. In this case, components common to those of the first embodiment illustrated in FIGS. 1 to 5 are affixed with the same reference symbols and the explanation thereof will be simplified. The fourth embodiment is different from the first embodiment in that one long edge part 691-4 and the other long edge part 692-4 in a slot 6 are formed linearly in its shape.

Figure 28A:
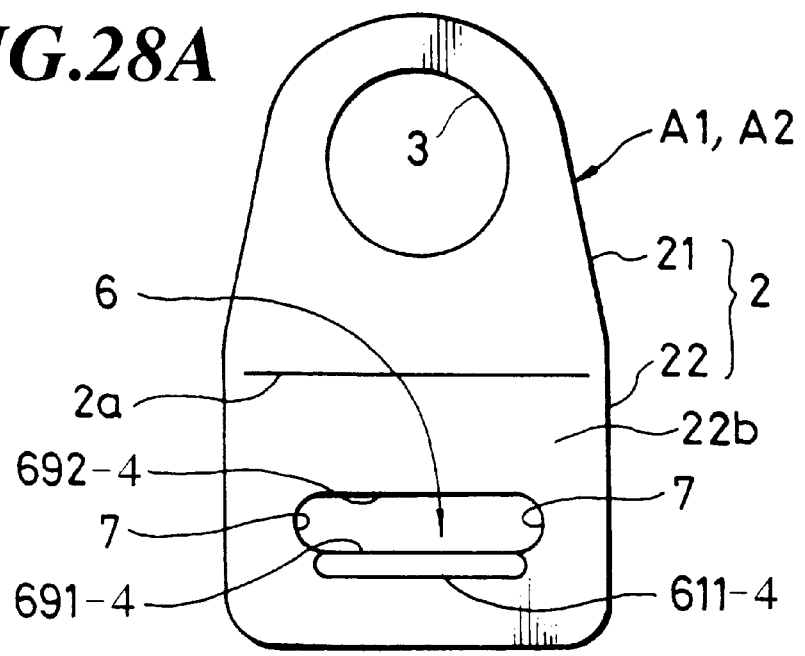
FIGS. 28A, 28B and 28C illustrate a seat belt anchorage plate as a fourth embodiment of the present invention.
Figure 28B:
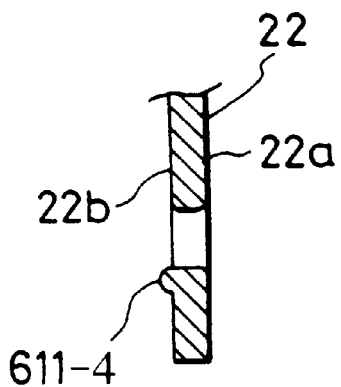
Figure 28C:
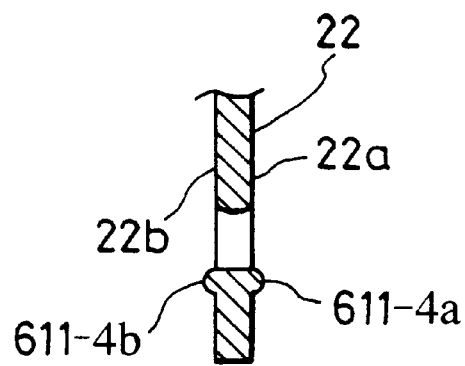

Specifically, the slot 6 is formed in an elongated shape, as shown in FIG. 28A. A protrusion 611 is formed only on one long edge part 691-4. This protrusion 611 protrudes only on the other surface 22*b* side of a base 2, as illustrated in FIG. 28B. The protrusion 611-4 may be formed as one protrusion 611-4*a* and the other protrusion 611-4*a* to protrude respectively from one surface 22*a* side and the other surface 22*b* from the base 2, as shown in FIG. 28C.

With a seat belt anchorage plate A1 constructed as described above, operational effects as good as those of the first embodiment can be attained regarding the constructions of the protrusion 611 or the one protrusion 611*a* and the other protrusion 611*b*.

Now, referring to FIGS. 29A, 29B and 29C, a fifth embodiment of the present invention will be described below. Herein, components common to those of the fourth embodiment are affixed with the same reference symbols and the explanation thereof will be simplified. The fifth embodiment is different from the fourth embodiment in that a protrusion is formed on the parts of one long edge part 691-5 and two short edge parts 7 and 7.

Figure 29A:
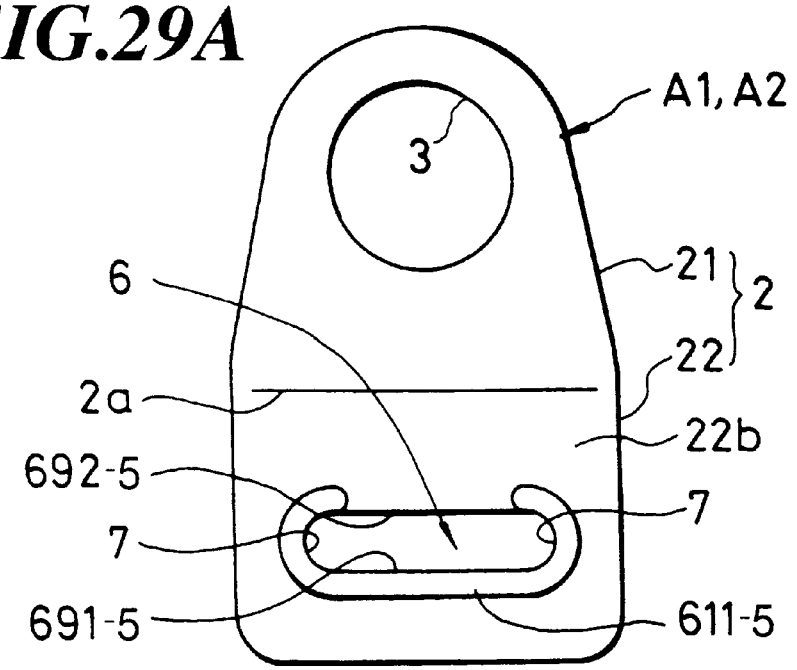
FIGS. 29A, 29B and 29C illustrate a seat belt anchorage plate as a fifth embodiment of the present invention.
Figure 29B:
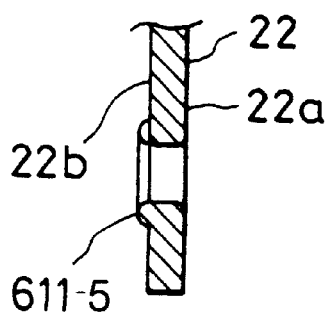
Figure 29C:
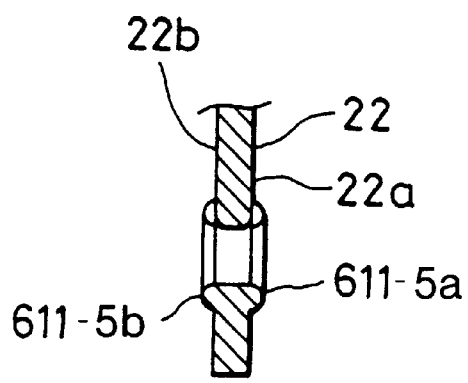

In other words, the protrusion 611 is formed, as illustrated in FIG. 29A, so as to wind about the one long edge part 691-5 and the two short edge parts 7 and 7. As shown in FIG. 29B, this protrusion 611 protrudes only on the other surface 22*b* side of a base 2. The protrusion 611-5 may be formed, as can be seen in FIG. 29C, as one protrusion 611*a* and the other protrusion 611*b* to respectively protrude from one surface 22*a* side and the other surface 22*b* side of the base 2.

According to a seat belt anchorage plate A1 constructed as mentioned above, the short edge parts 7 and 7 can be strengthened by the protrusion 611-5 or the one protrusion 611-5*a* and the other protrusion 611-5*b*. Besides, operational effects as good as those of the fourth embodiment can be achieved.

Next, referring to FIGS. 30A, 30B and 30C, a sixth embodiment of the present invention will be described in the following. Herein, common components to those of the fourth embodiment are affixed with the same reference symbols and the explanation thereof will be simplified. The sixth embodiment is different from the fourth embodiment in that a protrusion 611 is formed on one long edge part 691-6, the other long edge part 692-6 and two short edge parts 7 and 7.

Figure 30A:
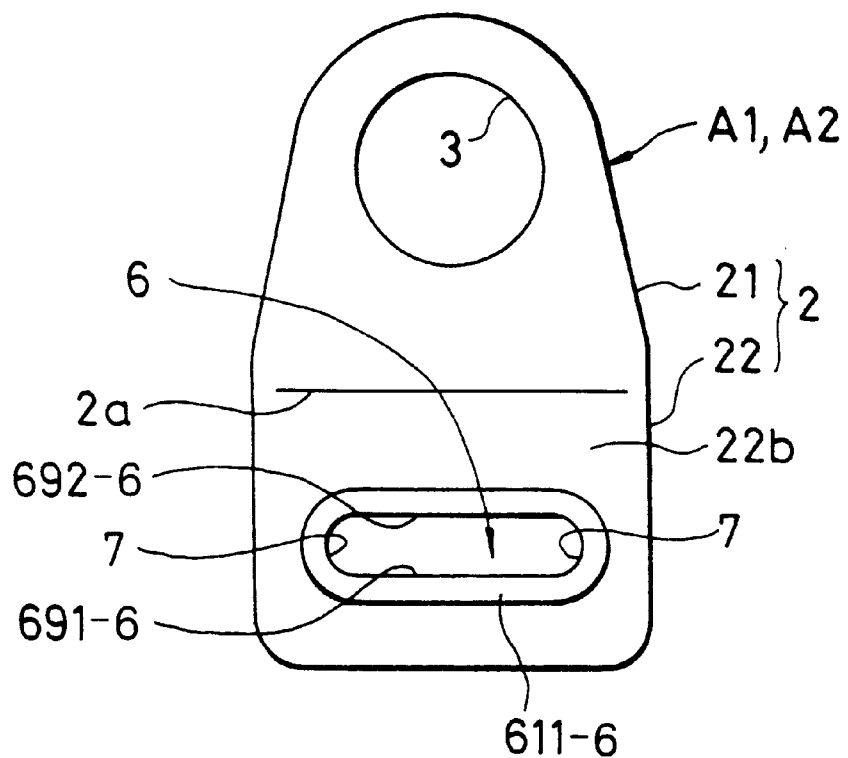
FIGS. 30A, 30B and 30C illustrate a seat belt anchorage plate as a sixth embodiment of the present invention.
Figure 30B:
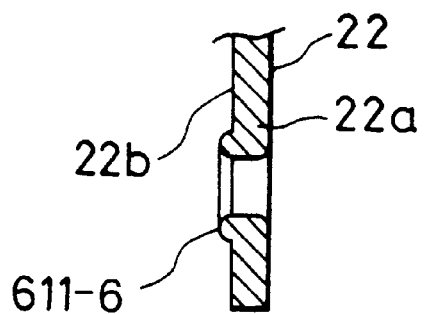
Figure 30C:
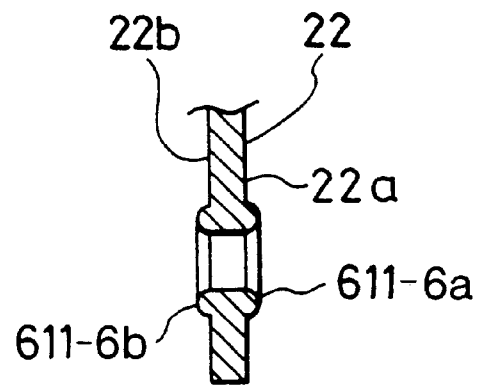

That is, as illustrated in FIG. 30A, the protrusion is formed on all the periphery of a slot 6. As illustrated in FIG. 30B, this protrusion 611-6 is provided to protrude only on the other surface 22b side of a base 2. Further, this protrusion 611-6 may be provided as one protrusion 611-6a and the other protrusion 611-6b to respectively protrude from one surface 22a and the other surface 22b of the base 2, as can be seen in FIG. 30C.

According to a seat belt anchorage plate A1 constructed as stated above, the entire part of the slot 6 can be strengthened due to the presence of the protrusion 611 or the one protrusion 611a and the other protrusion 611b. In addition, with this seat belt anchorage plate A1, operational effects similar to those of the fourth embodiment and the fifth embodiment can be attained.

Figure 31:
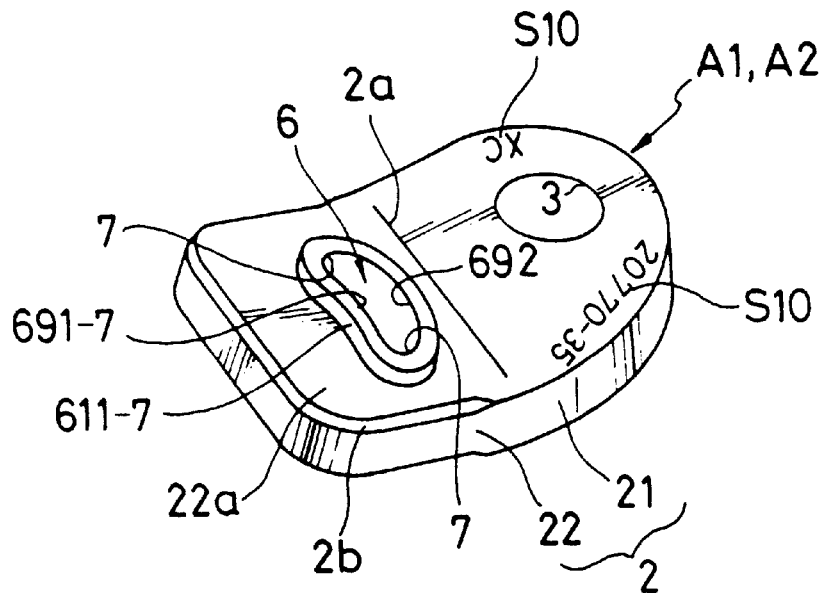
FIG. 31 is a perspective view of a seat belt anchorage plate manufactured by a manufacturing method illustrated as a seventh embodiment of the present invention.
Figure 32:
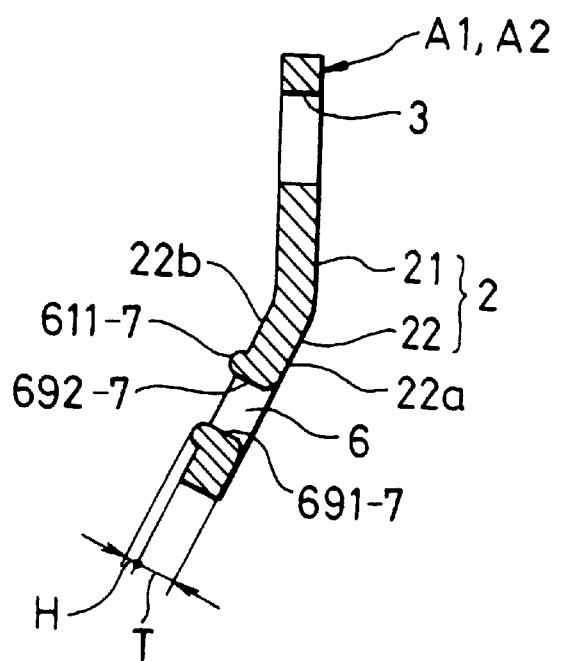
FIG. 32 is a sectional view of the seat belt anchorage plate manufactured by this manufacturing method.

Now, with reference to FIGS. 31 to 36 and 37A—37E, as a seventh embodiment of the present invention, a method for manufacturing a seat belt anchorage plate will be described. A seat belt anchorage plate A1 to be manufactured is constructed as shown in FIGS. 31 to 32, and has a construction substantially similar to that of the first embodiment previously illustrated in FIGS. 1 to 5 or that of the third embodiment previously shown in FIG. 7. Accordingly, components common to those of the first embodiment and the third embodiment are affixed with the same reference symbols and the explanation thereof will be simplified.

The seat belt anchorage plate A1 is manufactured by a press machine attached with metal dies which automatically and continuously carries out the operations of respective steps illustrated in FIGS. 33 to 36.

Initially, a steel plate PS wound like a coil which is a raw material of a base 2 is continuously fed to the press machine while it is stretched to be flat.

Figure 33:
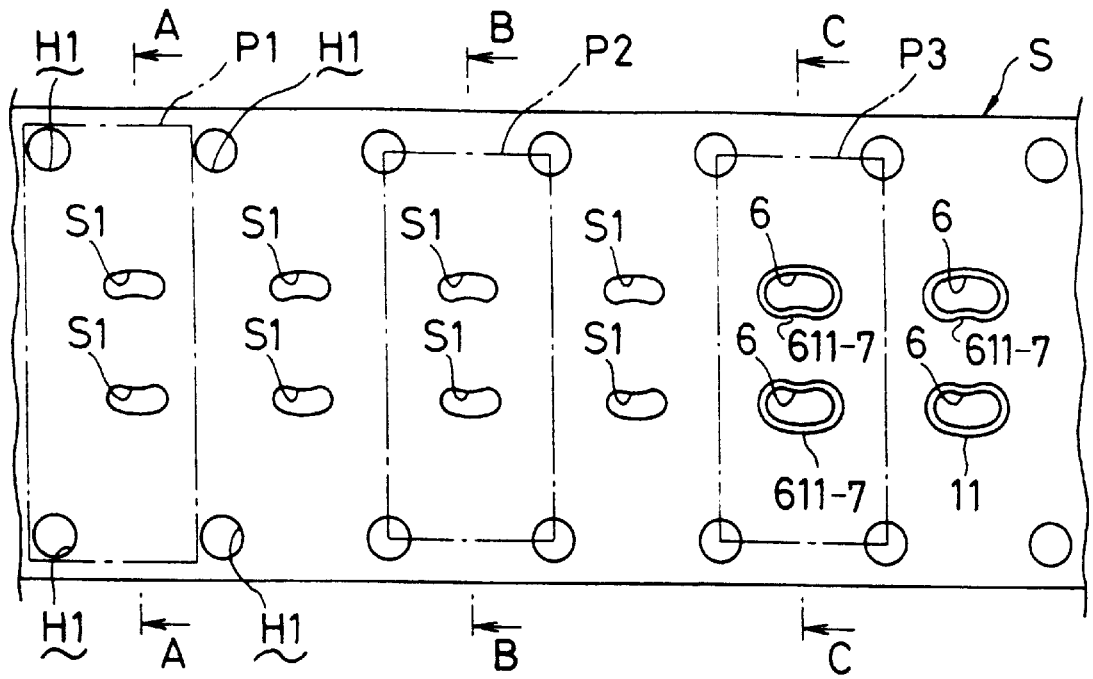
FIG. 33 is a plan view of a steel plate illustrating respective steps including a piercing step P1 to a burring step P3 in this manufacturing method.

Then, the preliminary holes S1 of slots 6 are first punched out from the steel plate S and positioning holes H1 are punched out in a piercing step P1 (see FIG. 33). At this time, as illustrated in FIG. 37A, burs S1a are formed on one surface Sa side of the steel plate S owing to the punching-out of the preliminary holes S1.

Then, the burs S1a produced in the piercing step P1 are pressed and removed by a surface-pressing in a surface-pressing step P2 (see FIG. 33). Thus, as shown in FIG. 37B, the steel plate is in a clear state in which the burs S1a are removed.

Then, the slot 6 is respectively formed by pushing a punch larger than the preliminary hole S1 into the preliminary slot S1 in a-next burring step P3 (see FIG. 33) and a protrusion 611-7 is formed by projecting a part of the steel plate S along the slot 6. Thus, as shown in FIG. 37C, the protrusions 611-7 protruding from the other surface Sb of the steel plate S. In this case, however, the protrusions under this state have their corner parts left as they are.

Figure 34:
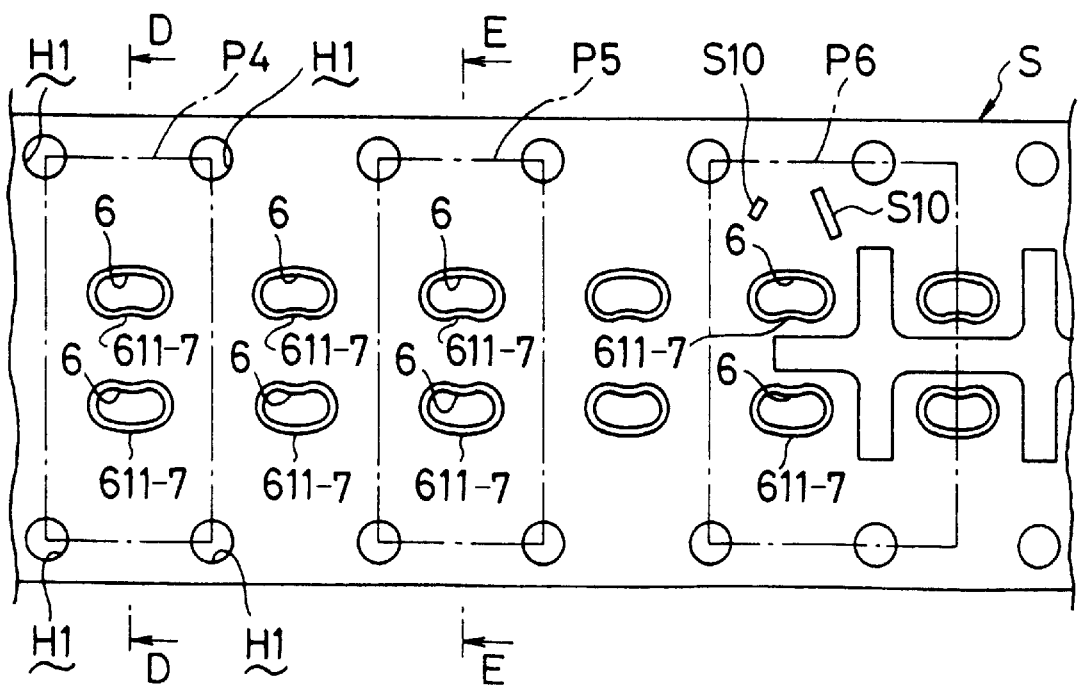
FIG. 34 is a plan view of a steel plate illustrating respective steps including a curved-surface forming step P4 to a cutting and stamping step P6 in the above stated manufacturing method.

Now, the protrusions 611-7 formed in the burring step P3 are respectively surface pressed and their corner parts are rounded in a curved-surface forming step P4 (see FIG. 34). Thus, as shown in FIG. 37D, the corner parts of the protrusions 611-7 are rounded.

Edges 6a (see FIG. 37E) opposite to the protrusions 611-7 in the slots 6 are surface pressed in a restriking step P5 so that the edge parts; 6a are formed in a curved surface with larger radius of curvature. That is, the edge parts 6a are formed as illustrated in FIG. 37E.

Then, the circumference of a part necessary for a folding and bending work is cut and markings S10 are stamped at prescribed positions in a cutting and stamping step P6 (see FIG. 34).

Figure 35:
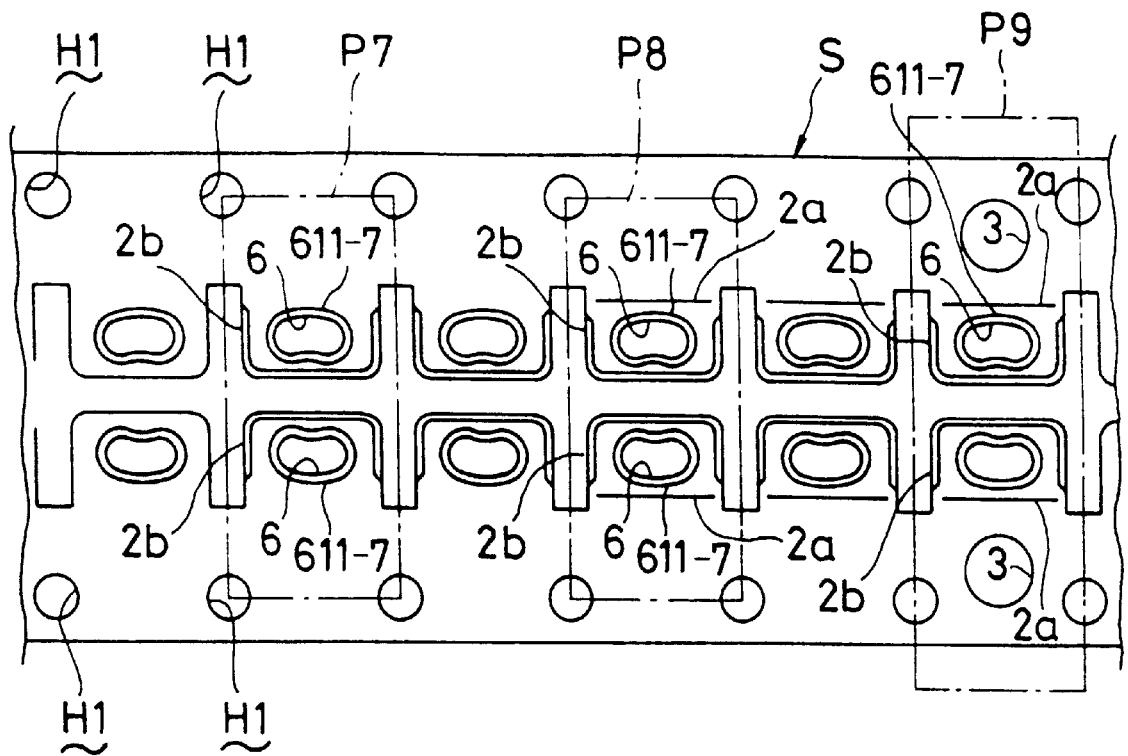
FIG. 35 is a plan view of a steel plate illustrating respective steps including a C surface-pressing step P7 to a piercing step P9.
Figure 36:
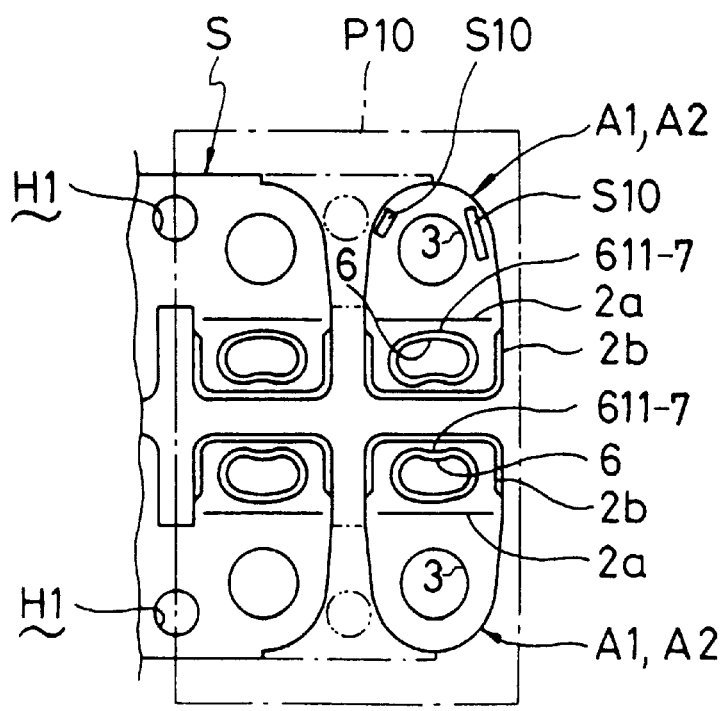
FIG. 36 is a plan view of a steel plate illustrating a separating step P10 in the above stated manufacturing method.
Figure 37:
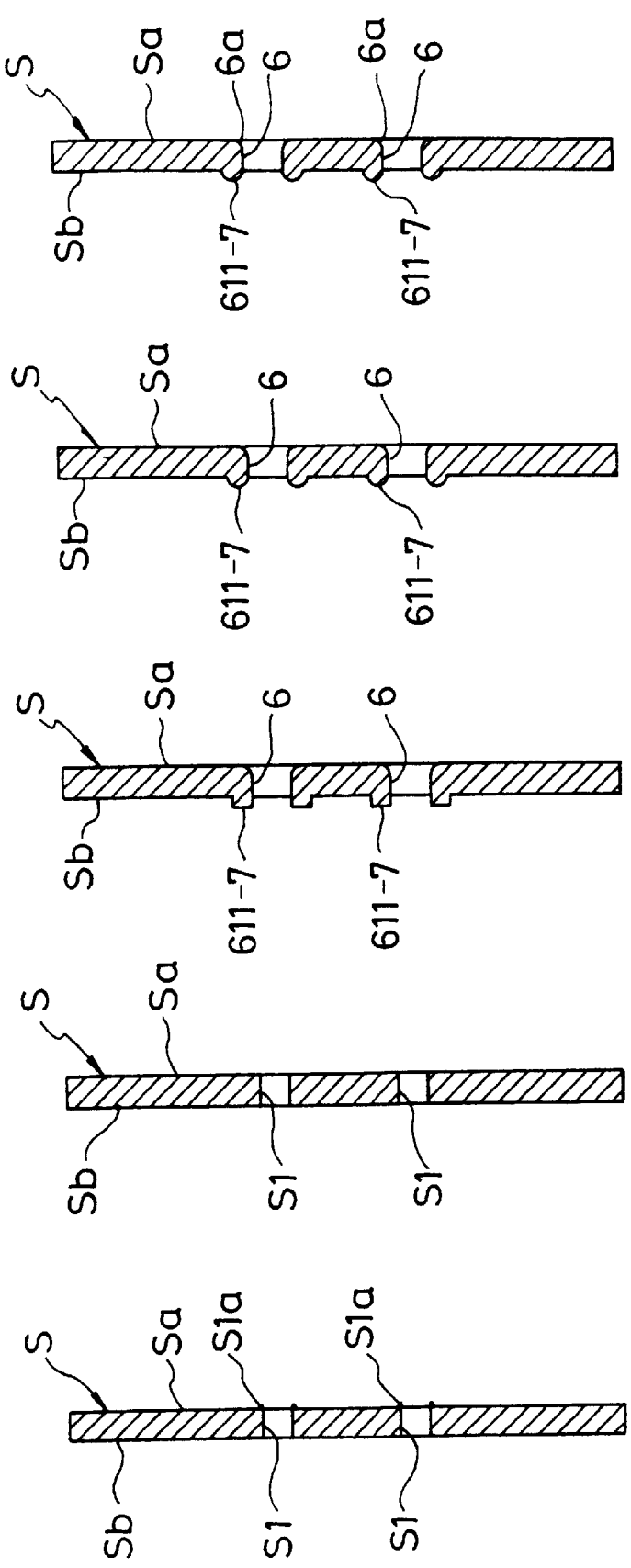
FIGS. 37A, 37B, 37C, 37D, and 37E illustrate sectional views of the steel plates in this manufacturing method.
Figure 38:
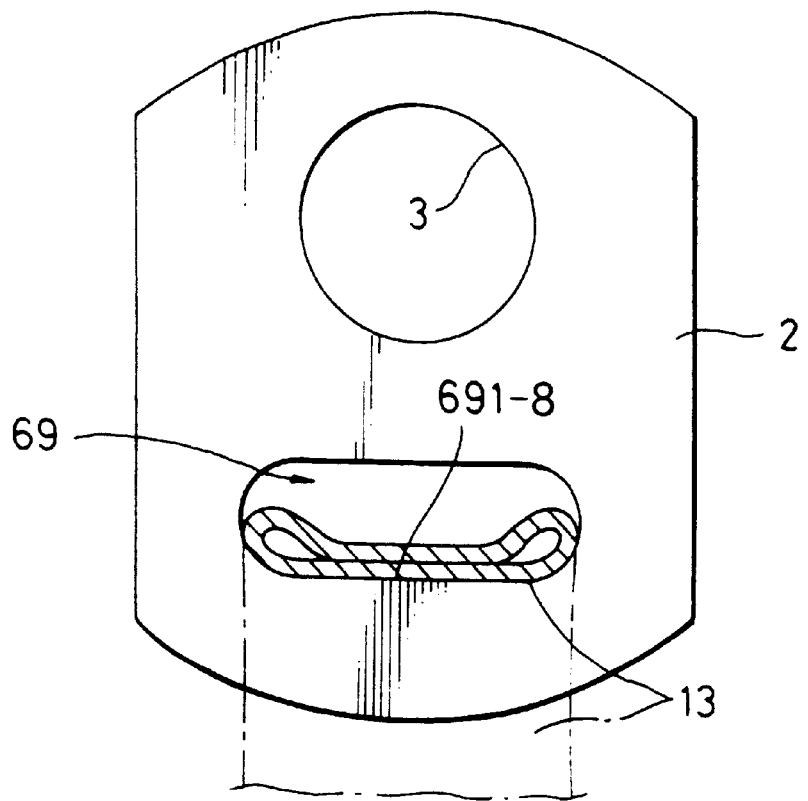
FIG. 38 is a front view of a seat belt anchorage plate illustrated as a conventional example.
Figure 39:
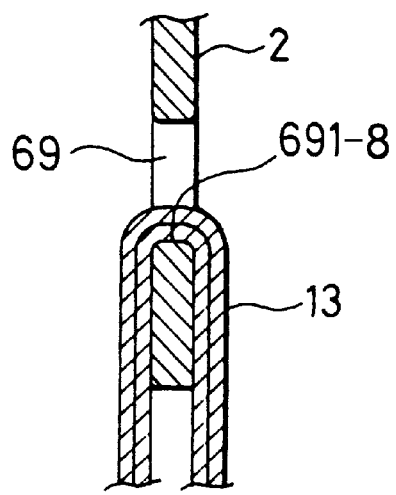
FIG. 39 is a sectional view of the seat belt anchorage plate of FIG. 38.

The corner parts of the part cut in the cutting and stamping step P6 are slantingly surface-pressed so that C-shaped chamfered parts 2b are formed in a C surface-pressing step P7 (see FIG. 35).

Now, the part necessary for a folding and bending work which is cut in the cutting and stamping step P6 is bent relative to the other part of the steel plate S in a bending step P8 (see FIG. 35). Thus, a bent part 2a is respectively formed on the steel plate S.

Then, bolt holes 3 are punched out on the steel plate S in a piercing step P9 (see FIG. 35).

Then, a part is cut in a separating step P10 (see FIG. 36) so that it is continuous to the part cut in the cutting and stamping step P6, and that part is separated as a seat belt anchorage plate A1 with a prescribed configuration. Namely, the seat belt anchorage plate A1 displayed in FIGS. 31 and 32 is completed.

According to the manufacturing method of the seat belt anchorage plate A1 as constituted above, since the burs produced in the piercing step P1 are removed in the surface-pressing step P2, the protrusion 611 can be clearly projected in the burring step P3, and the corner parts of the protrusion 611-7 are clearly formed in a curved surface shape in the curved-surface forming step P4. Further, the edge part 6a opposite to the protrusion 611 in the slot 6 can be smoothly rounded with larger radius of curvature owing to the restriking step P5. Accordingly, since the corner parts in the slot 6 can be finished to be rounded only by the press machine, a finish working (barrel finish working) or a coating work does not need to be done in another step. Therefore, cost can be reduced. Additionally, after the completion of the respective steps of the press machine including the cutting and stamping step P6 after the restriking step P5, the C-shape surface-pressing step P7, the bending step P8, the piercing step P9 and the separating step P10, the seat belt anchorage plates A1 as single bodies are automatically and continuously completed. Therefore, the seat belt anchorage plates A1 can be continuously and efficiently manufactured.

Further, since the protrusion 611-7 is formed by projecting a part of the steel plate S based on the burring work, it can be largely projected from the base 2. The protrusion 611-7 can be formed so that the amount of protrusion H of this protrusion 611 ranges from 15% to 60% as thick as the thickness T of the base 2, as can be seen in FIG. 32. Therefore, while the contact area of the belt with the seat belt anchorage plate can be increased, surface pressure exerted upon the belt can be decreased.

One protrusion 611a and the other protrusion 611b can be formed which respectively protrude from the one surface 22a and the other surface 22b of the base 2 by carrying out the method shown in the third embodiment, in addition to the burring step P3. The amount of protrusion H of the respective protrusions 611a and 611b which are formed in this case can also range from 15% to 60% as thick as the thickness T of the base 2, as shown in FIG. 32. Also with the manufacturing method in the embodiment 3, the respective protrusion 611 can be formed, as illustrated in FIG. 32, so that the amount of protrusion H of them ranges from 15% to 60% as thick as the thickness T of the base 2.

Further, the seat belt anchorage plates A1 and A2 shown in the fourth, the fifth and the sixth embodiments can be also manufactured by employing the manufacturing method of the seventh embodiment, or the method shown in FIGS. 12 to 14 in addition to the above method. Also in this case, the respective protrusions 611, 611*a* and 611*b* can be formed so that the amount of protrusion H of them ranges from 15% to 60% as thick as the thickness T of the base 2.

The reasons why the amount of protrusion H is set to 15% to 60% as thick as the thickness T of the base, as mentioned above, are that when the amount of protrusion H is less than 15% as thick as the thickness T, desired effects can not be obtained, and when the amount of protrusion H exceeds 60% as thick as the thickness T, not only the cost necessary for forming the protrusion is significantly increased, but also cracks may be undesirably generated in the protrusion during forming the protrusion. The amount of protrusion H is preferably located within a range of 20% to 50% of the thickness T of the base.

In some embodiments, when tension is exerted upon the belt, the part of the belt which is reflected in one long edge part is tightly fixed to that one long edge part. Namely, the part of the belt which is folded back takes a configuration in which its central part in its lateral direction expands similarly to the one long edge part. As a result, the belt hardly slides laterally along the one long edge part. Therefore, even if the direction of the tension of the belt does not coincide with the direction perpendicular to the one long edge part, the belt will not slide sideward along the one long edge part so that it does not gather to the end part of the belt.

Further, since the central part of the belt in its lateral direction swells similarly to that of the one long edge part, the belt is always brought into a state in which it is expanded in its lateral direction. Accordingly, even when the belt itself tends to thinly converge upon exertion of tension on the belt, the width of the belt is maintained in an original state in the one of the long edges. That is, the belt does not gather at one part on the one long edge part. In addition, since the one long edge part expands in the direction opposite to the tension, even when the one long edge part is slightly elastically deformed toward the direction of tension, this one long edge part is not recessed depending on the tension of the belt. Thus, the belt does not come together to the recessed part of the one long edge part, either. As mentioned above, since the width of the belt is properly maintained in the one long edge part, the tension of the belt is evenly transmitted to the one long edge part. Consequently, the durability of the belt and the seat belt anchorage plate can be improved and safety can be improved owing to the improvement of their durability.

Further, where the belt is formed by pressing and flattening a tubular member in a flat shape. the belt is preferably curved so as to be folded along the central line in its longitudinal direction in order to maintain the flattened shape of the belt. Also when the belt is inserted into the slot while it is curved in such a manner, both the end parts in the right and left sides of the belt hardly strike against both the end parts of the one long edge parts, since the central part of the one long edge part is so formed as to swell and the curved shape of the belt substantially coincides with the shape of one long edge part. Additionally, rounded and expanded parts at both the ends of the belt also hardly strike against the one long edge part. Therefore, the belt can be easily inserted into the slot.

In some embodiments, since the other long edge part opposed to one long edge part is so formed as to extend along the one long edge part, the configuration of the one or the other long edge part substantially correspond to that of the belt curved as stated above. Thus, the belt can be more easily inserted into the slot than in the case mentioned above.

Particularly, according to the invention claimed in claim 9, since short edge parts through which the one long edge part is connected to the other long edge part are formed in curved shapes of circular arc which are smoothly continued from one and the other long edge parts, the rounded and expanded parts at both the ends of the belt hardly collide with the short edge parts. Thus, the belt can be advantageously more readily inserted into the slot.

In some embodiments, since the one long edge part has a protrusion which protrudes from one surface side of the plate shaped member, the contact surface area of the belt abutting against the one long edge part is increased. As a result, the surface pressure of the belt can be reduced. Further, since the corner parts of the one long edge part are rounded along the direction in which the belt is folded back, the belt is prevented from breaking in the corner parts. Furthermore, since the corner parts are rounded and these corner parts do not need to undergo a coating work with vinyl chloride or polyethylene or the like, cost required for such a coating work can be reduced. That is, the cost can be lowered.

In some embodiments, since a protrusion which protrudes from the other surface of the plate shaped member is formed by bending a part of the plate shaped member from the one surface side to the other surface side of the plate shaped member, the protrusion can be projected greatly from the other surface side. Therefore, the area of the belt abutting against the one long edge part can be increased. In other words, surface pressure exerted on the belt from the one long edge part can be completely lowered. Therefore, the durability ,of the belt and the strength of the seat belt anchorage plate can be improved, and safety can be improved based on the improvement of their durability and strength. Further, since the corner parts of the one long edge part are rounded, the belt can be prevented from being broken in these corner parts. Additionally, since the corner parts are rounded and do not need to be subjected to a coating work with vinyl chloride or polyethylene or the like, cost necessary for such a coating work can be reduced. Namely, the cost can be lowered.

In some embodiments, since the one long edge part is formed so as to have one protrusion and the other protrusion which respectively protrude from one surface side and the other surface side of the plate shaped member, the contact surface area of the belt which abuts against the one long edge part is increased. As a result, the surface pressure of the belt can be further reduced.

In some embodiments, since the one long edge part is formed so as to have one protrusion and the other protrusion which respectively protrude from one surface side and the other surface side by bending a part of the plate shaped member from the one surface side to the other surface side of the plate shaped member and pressing the bent part to return to the one surface side, the area of a part against which the belt abuts can be increased. Consequently, the surface pressure of the folded-back part of the belt can be furthermore reduced.

In some embodiments, the short edge parts are also provided with a protrusion, so that the strength of the short edge parts can be increased. Therefore, even if the belt is gathered to the short edge part so that force is concentrated to the short edge part, the safety of the short edge part can be more improved than the past until the present. In addition, where a whole edge part except the one long edge part is also provided with a protrusion, the strength of an entire part around the slot can be improved.

In some embodiments, since the operational advantages as mentioned above can be exhibited, and the short edges are formed to be curved in a circular arc shape, the concentration of stress to the short edge parts can be relieved.

In some embodiments, the contact surface area the belt which abuts against the one long edge part can be increased owing to the presence of the protrusion. As a result, the surface pressure of the belt can be reduced. Where the protrusions are formed so as to protrude from both the one surface side and the other surface side of the plate member, the surface pressure of the belt can be most reduced.

In some embodiments, since the corner parts of the one long edge part are rounded along the direction in which the belt is folded back, the belt can be prevented from being broken in these corner parts. Further, since the corner parts are rounded and they do not need to undergo a coating work with vinyl chloride or polyethylene or the like, expenses required for such a coating work can be reduced. That is, the cost can, be lowered.

The amount of protrusion of the respective protrusions which are projected from the plate shaped member ranges from 20% to 60% as thick as the thickness of the plate shaped member, so that the contact surface area of the belt which abuts against the one long edge part can be increased. Such a magnification as 20% to 60% is enabled by forming the part of the slot by a bending work in some embodiments of the invention, or forming it by a burring work in other embodiments of the invention.

In some embodiments, since the sheared edge parts (burs) produced in a piercing step are removed in a surface-pressing step, the protrusion can be clearly projected in a burring step and the corner parts of the protrusion can be finely formed in a curved-surface forming step.

In some embodiments, the edge part opposite to the protrusion In the slot can be smoothly rounded with a larger radius of curvature in a restriking step. Therefore, since the corner parts can be finished so as to be rounded in a series of press working steps for forming the seat belt anchorage plate, a finishing work or a coating work must not be carried out in another step. Accordingly, the cost can be reduced.

What is claimed is:

1. A method of manufacturing a seat belt anchorage plate with a sheet metal base (2) having a first surface (22*a*) and a second surface (22*b*) on the reverse side of the first surface (22*a*), comprising the steps of:

forming a protruding portion (23) which protrudes from the second surface (22*b*) in a first direction from the first surface (22*a*) side to the second surface (22*b*) side by a drawing process of press-working, so that a curved surface (R1) is formed which is curved in a circular arc shape from the first surface (22*a*) to an inner surface of the protruding portion (23);

punching out a bottom of the protruding portion (23) so as to form a slot (6) which is composed of a first long edge (691-2), a second long edge (692-2) opposed to the first long edge (691-2) and short edges (7) connecting the first and second long edges (691-2, 692-2);

folding back an end part of the protruding portion (23) by curling process of press-working so that the end part of the protruding portion (23) comes close to the second surface (22*b*) of the sheet metal (2), thereby forming a first protrusion (611-2);

wherein the first protrusion (611-2) has a curved surface (R2) which is smoothly curled from the inner surface of the slot (6) to the first protrusion (611-2).

2. The method of manufacturing a seat belt anchorage plate according to claim 1, wherein the end part of the protruding portion (23) by the curling process of press-working is folded back in an outer side of the protruding portion (23).

3. The method of manufacturing a seat belt anchorage plate according to claim 1, wherein the forming step of the protruding portion (23) includes a plurality of times of the press-working.

* * * * *